(12) United States Patent
Salkintzis et al.

(10) Patent No.: US 12,526,759 B2
(45) Date of Patent: Jan. 13, 2026

(54) RELOCATING AN ACCESS GATEWAY

(71) Applicant: Lenovo (Singapore) PTE. LTD., New Tech Park (SG)

(72) Inventors: Apostolis Salkintzis, Athens (GR); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 394 days.

(21) Appl. No.: 17/916,764

(22) PCT Filed: Apr. 3, 2020

(86) PCT No.: PCT/EP2020/059658
§ 371 (c)(1),
(2) Date: Oct. 3, 2022

(87) PCT Pub. No.: WO2021/197634
PCT Pub. Date: Oct. 7, 2021

(65) Prior Publication Data
US 2023/0156650 A1  May 18, 2023

(51) Int. Cl.
*H04W 60/00* (2009.01)
*H04W 12/08* (2021.01)
*H04W 76/10* (2018.01)

(52) U.S. Cl.
CPC ........... *H04W 60/00* (2013.01); *H04W 12/08* (2013.01); *H04W 76/10* (2018.02)

(58) Field of Classification Search
CPC ..... H04W 12/08; H04W 60/00; H04W 88/16; H04W 12/041; H04W 12/069; H04W 92/02
See application file for complete search history.

(56) References Cited

U.S. PATENT DOCUMENTS 11,638,208 B2   4/2023  Salkintzis et al.
2017/0339539 A1* 11/2017  Guo ................... H04L 65/1016
(Continued)

FOREIGN PATENT DOCUMENTS

WO  WO-2019186504 A1 * 10/2019 .......... H04W 12/033
WO  WO-2019219209 A1 * 11/2019 ........... H04L 63/164
WO   2020/030851 A1    2/2020

OTHER PUBLICATIONS

Devarapalli et al., "Redirect Mechanism for the Internet Key Exchange Protocol Version 2 (IKEv2)", Network Working Group, Request for Comments: 5685, Nov. 2009, pp. 1-15.
(Continued)

*Primary Examiner* — Khawar Iqbal
(74) *Attorney, Agent, or Firm* — Kunzler Bean & Adamson

(57) ABSTRACT

Apparatuses, methods, and systems are disclosed for relocating an access gateway during UE registration. One apparatus includes a transceiver that communicates with a non-3GPP access network and a processor that selects a first N3IWF and sends a first message to the first N3IWF containing a NAS message to initiate a first registration procedure with the mobile communication network. The processor receives a first response from the first N3IWF containing an address of a second N3IWF and an identity of an AMF. The processor sends a second message to the first N3IWF indicating that the first registration procedure via the first N3IWF is to be stopped and sends a third message to the second N3IWF indicting that the first registration is to be relocated to the second N3IWF. The processor completes the first registration procedure via the second N3IWF.

20 Claims, 15 Drawing Sheets

(56) References Cited

U.S. PATENT DOCUMENTS

| | | | | |
|---|---|---|---|---|
| 2019/0274039 | A1* | 9/2019 | Prasad | H04W 12/37 |
| 2019/0274072 | A1* | 9/2019 | Prasad | H04W 8/22 |
| 2019/0335330 | A1* | 10/2019 | Salkintzis | H04W 4/80 |
| 2021/0022024 | A1 | 1/2021 | Yao et al. | |
| 2021/0127271 | A1* | 4/2021 | Wu | H04W 12/0471 |
| 2021/0185527 | A1* | 6/2021 | Li | H04L 63/08 |
| 2022/0240213 | A1 | 7/2022 | Ly et al. | |
| 2022/0346051 | A1* | 10/2022 | Salkintzis | H04W 76/10 |
| 2023/0146052 | A1* | 5/2023 | Salkintzis | H04W 76/10 455/435.2 |
| 2023/0156650 | A1 | 5/2023 | Salkintzis et al. | |
| 2024/0073686 | A1* | 2/2024 | Ben Henda | H04W 12/10 |

OTHER PUBLICATIONS

PCT/EP2020/059658, "Notification of Transmittal of the International Search Report and the Written Opinion of the International Searching authority, or the Declaration", International Searching Authority, Nov. 9, 2020, pp. 1-13.

PCT/EP2020/059652, "Notification of Transmittal of the International Search Report of the International Searching authority, or the Declaration", International Searching Authority, Oct. 11, 2020, pp. 1-4.

PCT/EP2020/059652, "Notification of Transmittal of the Written Opinion of the International Searching authority, or the Declaration", International Searching Authority, Oct. 11, 2020, pp. 1-8.

Nokia, et.al., "New WID on Support of different slices over different Non 3GPP access", 3GPP SA WG2 Meeting #137E S2-2002602, Feb. 24-27, 2020, pp. 1-3.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

3GPP, "3rd Generation Partnership Project; Technical Specification Group Core Network and Terminals; Access to the 3GPP 5G Core Network (5GCN) via Non-3GPP Access Networks (N3AN); Stage 3 (Release 16)", 3GPP TS 24.502 V16.3.0, Mar. 2020, pp. 1-84.

3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.

3GPP, "3rd Generation Partnership Project; Technical Specification Group Radio Access Network; NG-RAN; NG Application Protocol (NGAP) (Release 15)", 3GPP TS 38.413 V15.7.0, Mar. 2020, pp. 1-331.

* cited by examiner

RELOCATING AN ACCESS GATEWAY

The subject matter disclosed herein relates generally to relocating an access gateway, e.g., while UE registration is ongoing.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Point Name ("APN"), Access Stratum ("AS"), Access Network Information ("ANT"), Application Programing Interface ("API"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAT"), Next Generation (e.g., 5G) Node-B ("gNB"), Next Generation Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Transmission Control Protocol ("TCP"), Transmit ("Tx"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), User Location Information ("ULT"), Wireless Local Area Network ("WLAN"), and Worldwide Interoperability for Microwave Access ("WiMAX").

In certain embodiments, a UE may connect to a 5G core in a PLMN via several types of non-3GPP access networks, all of them providing IP connectivity between the UE and the 5G core ("5GC") via an access gateway.

BRIEF SUMMARY

Methods for relocating an access gateway during UE registration are disclosed. Apparatuses and systems also perform the functions of the methods.

One method of a TNGF, e.g., for relocating an access gateway during UE registration, includes initiating registration of a remote unit with a mobile communication network and receiving a relocation command from an AMF in the mobile communication network while the registration is ongoing. Here, the relocation command contains an address of a first TNGF in the mobile communication network and a first security key. The method includes determining whether connectivity with the first TNGF is supported. If connectivity with the first TNGF is supported, then the method includes sending a first request to the first TNGF, the first request containing a remote unit identity and an AMF identity. However, if connectivity with the first TNGF is not supported, then the method includes sending a relocation reject message to the AMF.

Another method of a TNGF, e.g., for relocating an access gateway during UE registration, includes receiving a first request from a first TNGF, the first request containing a remote unit identity and an AMF identity. Here, the first TNGF initiated registration of the remote unit with a mobile communication network. The method includes selecting an AMF in the mobile communication network using the AMF identity and sending a relocation notify message to the AMF, the relocation notify message containing the remote unit identity. Here, the relocation notify message indicates that the registration of the remote unit with the mobile communication network is to be resumed via the sending TNGF. The method includes receiving a second request from the AMF containing a security key in response to sending the relocation notify message, sending a first response to the first TNGF, and establishing secure connectivity (e.g., IPsec SA) with the remote unit by applying the security key.

One method of an AMF, e.g., for relocating an access gateway during UE registration, includes receiving a first request from a first access gateway, the first request including a first NAS message from a remote unit, the first NAS message initiating registration of the remote unit with a mobile communication network via the first access gateway. The method includes determining to relocate the registration of the remote unit to a second access gateway. Here, the second access gateway is to resume registration of the remote unit. The method includes sending a relocation command to the first access gateway, the relocation command including an address of the second access gateway and relocates the registration of the remote unit to the second access gateway in response to sending the relocation command.

One method of a UE, e.g., for relocating an access gateway during UE registration, includes selecting a first N3IWF for registering with a mobile communication network via the first N3IWF and sending a first message to the first N3IWF, the first message containing a NAS message that initiates a first registration procedure with the mobile communication network. The method includes receiving a first response from the first N3IWF and sending a second message to the first N3IWF, the second message indicating that the first registration procedure via the first N3IWF is to be stopped. Here, the first response contains an address of a second N3IWF and an identity of an AMF in the mobile communication network. The method includes sending a third message to the second N3IWF and completing the first registration procedure via the second N3IWF. Here, the third message indicates that the first registration is to be relocated to the second N3IWF.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
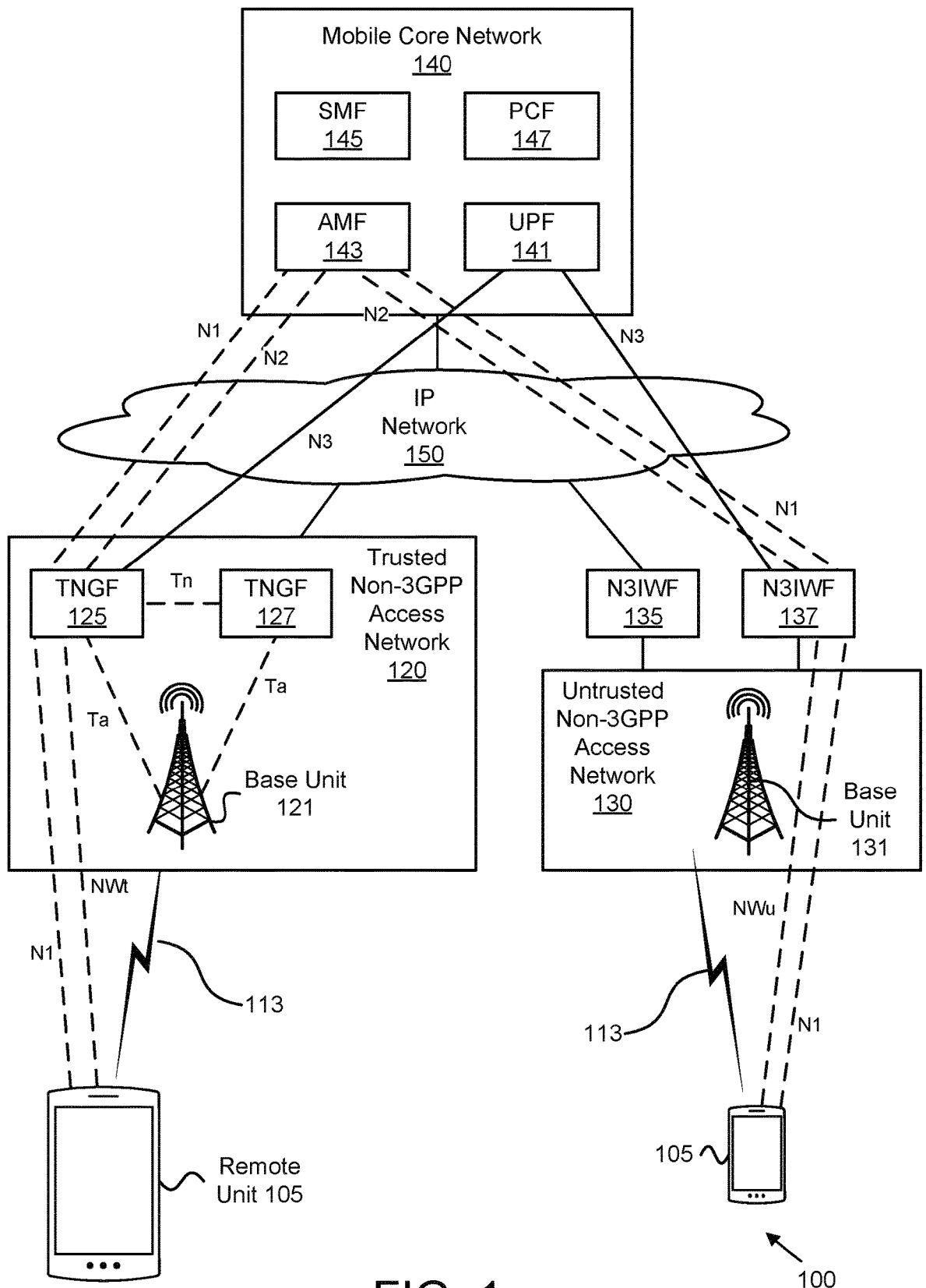
FIG. 1 is a diagram illustrating one embodiment of a wireless communication system for relocating an access gateway during UE registration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for relocating an access gateway during UE registration. As specified in the current 5G specifications (see e.g. 3GPP TS 23.501 v16.3.0 and 3GPP TS 23.502 v16.3.0), a UE may connect to a 5G core in a PLMN via several types of, so-called, untrusted non-3GPP access networks, said access networks providing connectivity between the UE and the 5G system via a Non-3GPP Interworking Function ("N3IWF"). Note that the N3IWF may be deployed as part of the 5G core. Alternatively, the N3IWF may be deployed as part of the access network. These access networks are deemed as untrusted from the 5G core network point of view because they do not support any secure signaling interfaces or any interworking with the 5G core network. Also, they are deemed as non-3GPP access networks because they are based on technology not specified by 3GPP such as Wi-Fi access networks and wireline access networks, among others.

Additionally, a UE may connect to a 5G core in a PLMN via several types of, so-called, trusted non-3GPP access networks, all of them providing connectivity between the UE and the 5G system via a Trusted Non-3GPP Gateway Function ("TNGF"). Note that the TNGF may be deployed as part of the access network, thereby forming a Trusted Non-3GPP Access Network ("TNAN"). These access networks are deemed as trusted from the 5G core network point of view because they support secure signaling interfaces and interworking with the 5G core network. Such networks are deemed as non-3GPP access networks because they are based on technology not specified by 3GPP such as Wi-Fi access network and wireline access networks, among others.

Presently, when a UE registers with a 5G core network in a PLMN via a non-3GPP access network, a single interworking function (e.g., N3IWF or TNGF, also referred to as "access gateway") must be selected for this UE (out of many deployed), which enables connectivity between the UE and the 5G core network via the non-3GPP access. Since all interworking functions currently provide the same capabilities (e.g. all support connectivity to the same 5G network slices), then the selection of the interworking function is a simple process. Any interworking function can be selected, as long as it has enough resources to support the UE.

However, not all interworking functions may provide the same capabilities. For example, different interworking functions may be deployed that provide access to different network slices, each one identified by a Single Network Slice Selection Assistance Information (S-NSSAI). Accordingly, it may be necessary to relocate the registration of the UE from an initially selected interworking function to a different interworking function when the 5G core network determines that the initially selected interworking function is not capable to support the slices allowed for the UE.

Disclosed herein are procedures that enable a UE to register with a 5G core network by initially using a first interworking function that is later substituted by (i.e., relocated to) a second interworking function, where the registration is completed via the second interworking function and where the first interworking function is determined to be not suitable for the UE (e.g. cannot support the slices allowed for the UE). An interworking function referred to above can be either a N3IWF, when the non-3GPP access network is considered "untrusted" by the 5G core network, or a TNGF, when the non-3GPP access network is considered "trusted" by the 5G core network.

FIG. 1 depicts a wireless communication system 100 for relocating an access gateway during UE registration, according to embodiments of the disclosure. In one embodiment, the wireless communication system 100 includes at least one remote unit 105, at least one trusted non-3GPP access network ("TNAN") 120, at least one untrusted non-3GPP access network ("untrusted AN") 130, and a mobile core network 140 in a PLMN. The TNAN 120 may be composed of at least one base unit 121. The untrusted AN 130 may be composed of at least one base unit 131. The remote unit 105 may communicate with the TNAN 120 using non-3GPP communication links 113, according to a radio access technology deployed by TNAN 120. Similarly, the remote unit 105 may communicate with the untrusted AN 130 using non-3GPP communication links 113, according to a radio access technology deployed by untrusted AN 130. Even though a specific number of remote units 105, base units 110, TNANs 120, untrusted ANs 130, and mobile core networks 140 are depicted in FIG. 1, one of skill in the art will recognize that any number of remote units 105, base units 110, TNANs 120, untrusted ANs 130, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the TNAN 120 via uplink ("UL") and downlink ("DL") communication signals. Furthermore, the UL and DL communication signals may be carried over the communication links 113. Note, that the TNAN 120 is an intermediate network that provide the remote units 105 with access to the mobile core network 140, e.g., via the IP network 150. Similarly, the remote units 105 may communicate directly with one or more of the base units 131 in the untrusted AN 130 via UL and DL communication signals. Furthermore, the UL and DL communication signals may be carried over the communication links 113. Note, that the untrusted AN 130 is an intermediate network that provide the remote units 105 with access to the mobile core network 140 via a N3IWF and via e.g. the IP network 150.

The base units 121 and 131 may serve a number of remote units 105 within a serving area, for example, a cell or a cell sector, via a communication link 113. The base units 121 and 131 may communicate directly with one or more of the remote units 105 via communication signals. Generally, the base units 121 and 131 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 121, 131.

As noted above, the TNAN 120 supports secure signaling interfaces and interworking with the 5G core network. The TNAN includes at least one TNGF; in the depicted embodiment the TNAN 120 includes a first TNGF 125 and a second TNGF 127. In certain embodiments, the TNAN 120 supports a Tn interface between the TGNF in the TNAN 120. Details of TNGF relocation where Tn is supported are described below with reference to FIGS. 3A-3C. In other embodiments, the TNAN 120 does not support the Tn interface. Details of TNGF relocation where Tn is not supported are described below with reference to FIGS. 4A-4B.

When a remote unit 105 registers with the mobile communication network 140 via the TNAN 120, the remote unit 105 establishes a 'NWt' connection with the serving TNGF (e.g., TNGF 125, as depicted) and establishes a 'N1' connection with the AMF 143 via said TNGF. The serving TNGF establishes a 'N2' connection with the AMF 143 and establishes a 'N3' connection with the UPF 141. While FIG. 1 shows the interfaces being established via the TNGF 125, in other embodiments, these interfaces may be established via the TNGF 127.

The base units 121 may be distributed over a geographic region. In certain embodiments, a base unit 121 may also be referred to as a Trusted Non-3GPP Access Point ("TNAP"), an access terminal, an access point, a base, a base station, a relay node, a device, or by any other terminology used in the art. The base units 121 are generally part of a radio access network ("RAN"), such as the TNAN 120, that may include one or more controllers communicably coupled to one or more corresponding base units 121. These and other elements of radio access network are not illustrated but are well known generally by those having ordinary skill in the art. The base units 121 connect to the mobile core network 140 via the TNAN 120.

The untrusted AN 130 does not support secure signaling interfaces or interworking with the 5G core network. Accordingly, access to the mobile core network 140 via untrusted AN 130 is facilitated using a N3IWF. In the depicted embodiment, the system 100 includes a first N3IWF 135 and second N3IWF 137. Note that the N3IWFs 135, 137 may be located in the core network 140. In certain embodiments, the N3IWFs 135, 137 support connectivity to one or more 5GC networks for UEs which do support the NAS protocol over non-3GPP access and the applicable NAS procedures. Details of N3IWF relocation are described below with reference to FIGS. 2A-2C.

When a remote unit 105 registers with the mobile communication network 140 via the untrusted AN 130, the remote unit 105 establishes a 'NWu' connection with the serving N3IWF (e.g., N3IWF 137, as depicted) and establishes a 'N1' connection with the AMF 143 via said N3IWF. The serving N3IWF establishes a 'N2' connection with the AMF 143 and establishes a 'N3' connection with the UPF 141. While FIG. 1 shows the interfaces being established via the N3IWF 137, in other embodiments, these interfaces may be established via the N3IWF 135.

The base units 131 may be distributed over a geographic region. In certain embodiments, a base unit 131 may also be referred to as an access terminal, an access point, a base, a base station, a relay node, a device, or by any other terminology used in the art. The base units 131 are generally part of a radio access network ("RAN"), such as the untrusted AN 130, that may include one or more controllers communicably coupled to one or more corresponding base units 131. These and other elements of radio access network are not illustrated but are well known generally by those having ordinary skill in the art. The base units 131 connect to the mobile core network 140 via the untrusted AN 130.

In some embodiments, the remote units 105 communicate with an application server (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the TNAN 120 and/or untrusted AN 130. The mobile core network 140 then relays traffic between the remote unit 105 and, e.g., an application server in the IP network 150 using the PDU session. Note that the remote unit 105 may establish one or more PDU sessions (or other data connections) with the mobile core network 140. As such, the remote unit 105 may have at least one PDU session for communicating with the IP network 150. The remote unit 105 may establish additional PDU sessions for communicating with other data network and/or other communication peers.

In one embodiment, the mobile core network 140 is a 5G core ("5GC") or the evolved packet core ("EPC"), which may be coupled to a data network (e.g., the IP network 150, such as the Internet and private data networks, among other data networks). A remote unit 105 may have a subscription or other account with the mobile core network 140. The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 141. The mobile core network 140 also includes multiple control plane functions including, but not limited to, an Access and Mobility Management Function ("AMF") 143, a Session Management Function ("SMF") 145, and a Unified Data Management function ("UDM") 149. In certain embodiments, the mobile core network 140 may also include a Policy Control Function ("PCF"), an Authentication Server Function ("AUSF"), a Network Repository Function ("NRF") (used by the various NFs to discover and communicate with each other over APIs), or other NFs defined for the 5G Core.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF, and the UDM 149. In another example, each network slice includes an AMF, an SMF and a UPF. Although specific numbers and types of network functions are depicted in FIG. 1, one of skill in the art will recognize that any number and type of network functions may be included in the mobile core network 140.

When a remote unit 105 registers with a mobile core network 140 via non-3GPP access, a first interworking function (N3IWF 135-137 or TNGF 125-127) is selected. According to prior 3GPP standards, the selected interworking function is to be used during the entire duration of the registration procedure. However, to enable substitution (i.e., relocation) of the first interworking function with a second interworking function in the middle of the registration procedure and resume the registration procedure via the second interworking function, the AMF 143 may send a Relocation Command to the first interworking function (i.e., the initially selected interworking function) so that the first interworking function does not complete the registration procedure, but instead the second interworking function resumes and completes the registration procedure.

Figure 2A:
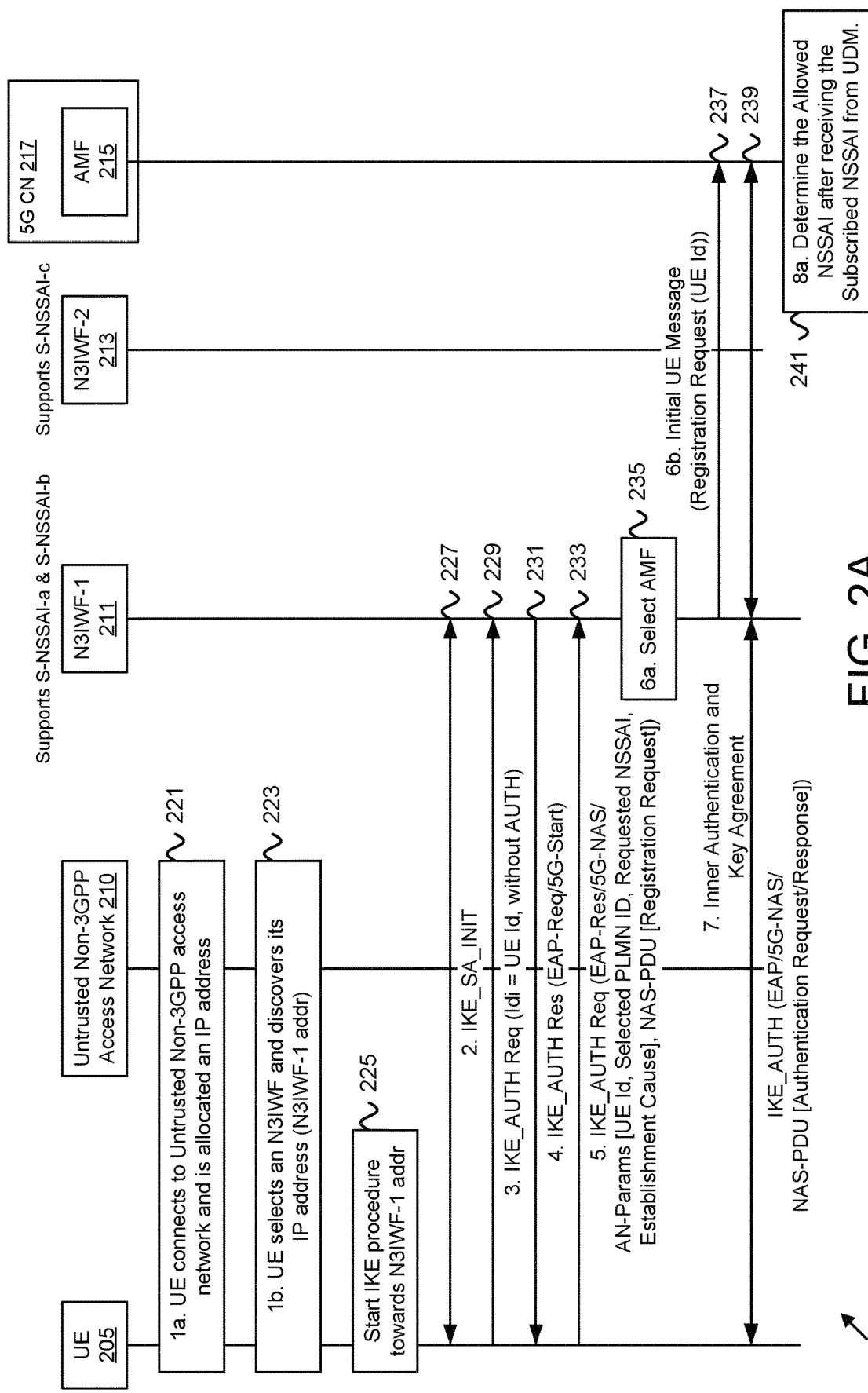
FIG. 2A is a signal flow diagram illustrating one embodiment of a procedure for N3IWF relocation during UE registration.
Figure 2B:
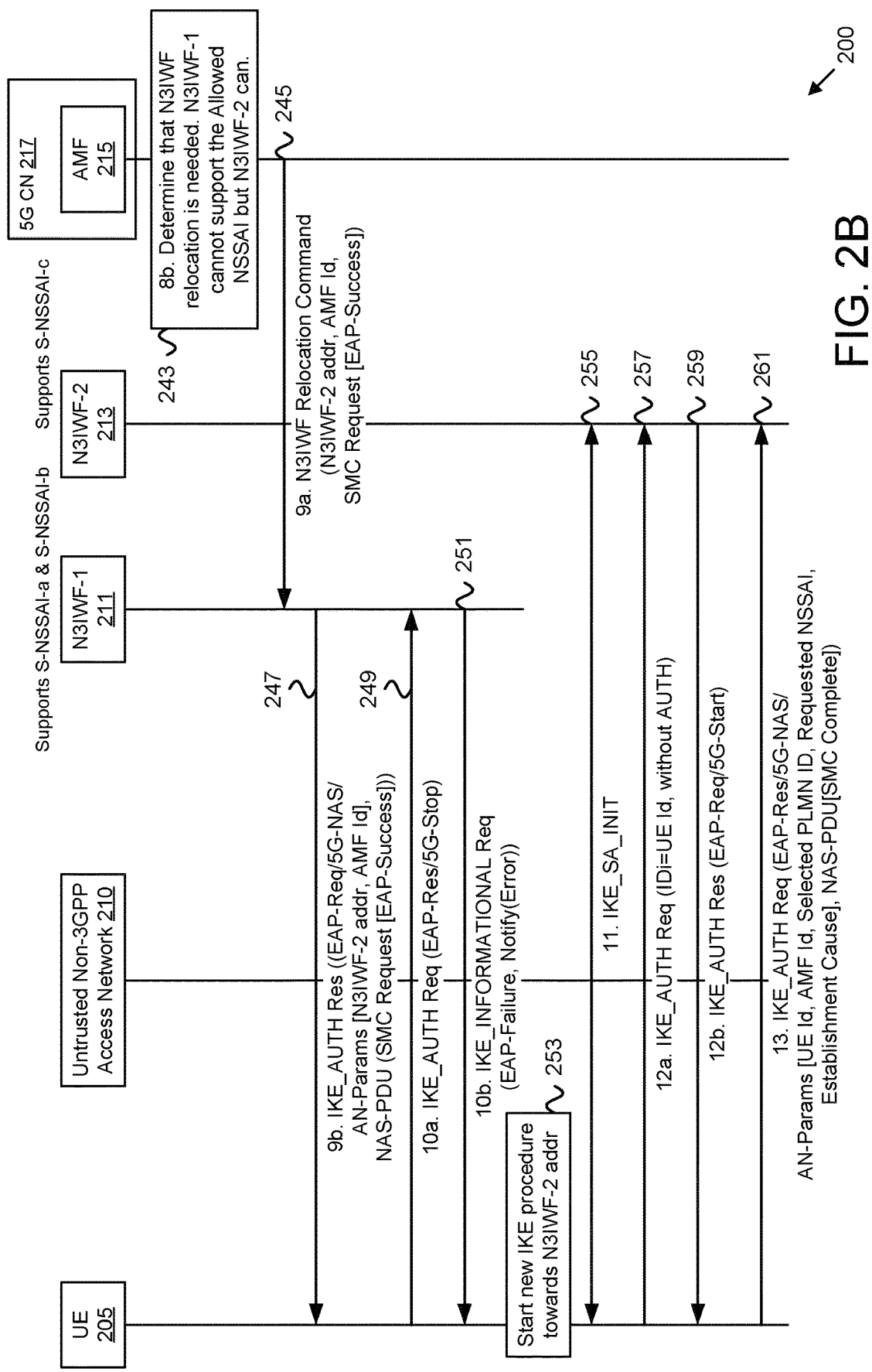
FIG. 2B is a continuation of the procedure depicted in FIG. 2A.
Figure 2C:
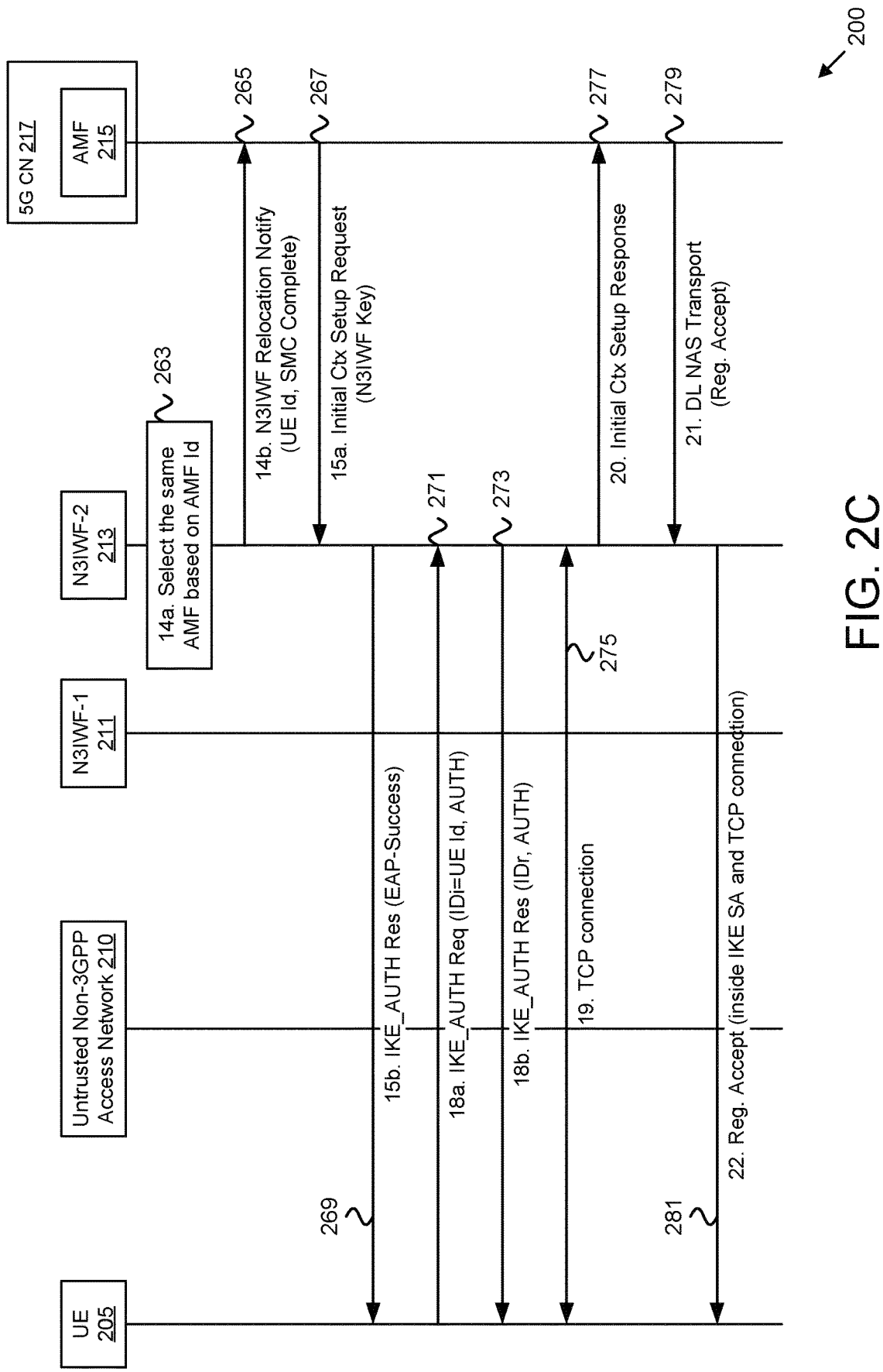
FIG. 2C is a continuation of the procedure depicted in FIG. 2B.

FIGS. 2A-2C depict a procedure 200 for relocating an access gateway during UE registration, according to embodiments of the disclosure. The procedure 200 involves a UE 205 (e.g., one embodiment of the remote unit 105), a first N3IWF ("N3IWF-1") 211, a second N3IWF ("N3IWF-2") 213, and an AMF 215 in the 5G core network 217. The procedure 300 details signaling flow for a scenario where a UE 205 attempts to register with a 5G core network 217 via an untrusted non-3GPP access network 210. Similar steps take place in other scenarios, e.g., when the UE 205 attempts to perform a Service Request, instead of a Registration Request. In some embodiments, the N3IWFs 211-213 are part of the 5G core network 217. In some embodiments, the N3IWFs 211-213 are part of the untrusted access network.

FIG. 2A depicts a first network deployment where the non-3GPP access network is an untrusted non-3GPP access network 210 and the UE 205 initiates registration with the 5G core network 217 using a first N3IWF ("N3IWF-1") 211. During the registration, the AMF 230 determines that the N3IWF 211 is unsuitable and relocates the registration to a second N3IWF ("N3IWF-2") 213.

Referring to FIG. 2A, the procedure 200 begins at Step 1 as the UE 205 decides to connect to a specific 5G PLMN via an available non-3GPP access network. The UE 205 cannot discover a non-3GPP access network supporting 5G connectivity (or "trusted" connectivity) to this 5G PLMN, thus, it connects to an "untrusted" non-3GPP access network 210 and obtains an IP address (see block 221). At step 1b, the UE 205 selects an N3IWF (e.g., N3IWF-1 211) in the 5G PLMN and discovers its IP address (see block 223).

Subsequently, the UE 205 initiates a registration procedure for untrusted non-3GPP access, e.g., as specified in 3GPP TS 23.502, clause 4.12.2.2, by starting an Internet Key Exchange ("IKE") procedure (see block 225). Note that the N3IWF is discovered in step 1b without considering any NSSAI information, hence, the discovered N3IWF-1 211 may not support the allowed NSSAI for this UE 205 (i.e., the NSSAI allowed by the UE 205's subscription) and a different N3IWF may need to be used instead. In other words, the discovered N3IWF-1 211 may need to be relocated. The subsequent steps in this procedure specify how this relocation can be carried out. Note that the NSSAI is a list of one or more S-NSSAIs. In the depicted embodiments, the N3IWF-1 211 supports the S-NSSAI-a and S-NSSAI-b, but not does not support S-NSSAI-c. However, the N3IWF-2 213 does support S-NSSAI-c.

At Step 2, the UE 205 proceeds with the establishment of an IPsec Security Association ("IPsec SA") with the selected N3IWF-1 211 by initiating an IKE initial exchange according to RFC 7296 (see messaging 227).

At Step 3, the UE 205 initiates an IKE_AUTH exchange by sending an IKE_AUTH Request message (see messaging 229). The AUTH payload is not included in this IKE_AUTH Request message, which indicates that the IKE_AUTH exchange is to use EAP signaling.

At Step 4, the N3IWF-1 211 responds with an IKE_AUTH response message, which includes an EAP- Request/5G-Start packet indicating to UE 205 that an EAP-5G session starts and the UE 205 can start sending NAS messages encapsulated within EAP-5G packets (see messaging 231).

At Step 5, the UE 205 sends an IKE_AUTH Request to N3IWF-1 211 (see messaging 233), which includes an EAP-Response/5G-NAS packet that contains Access Network parameters (AN-Params) and a Registration Request message (or a Service Request message). The AN-Params contains a UE identity (e.g., SUCI or 5G-GUTI), the Selected PLMN identity, an Establishment cause and (optionally) a Requested NSSAI. The Establishment cause provides the reason for Requesting a signaling connection with the 5G core network 217.

At Step 6, the N3IWF-1 211 selects an AMF 215 in the 5G core network 217 of the selected PLMN based on the received AN-Params and local policy, e.g., as specified in 3GPP TS 23.501, clause 6.3.5 (see block 235). In turn, the N3IWF-1 211 forwards the Registration Request (or the Service Request) received from the UE 205 to the selected AMF 215 within an N2 Initial UE 205 Message (see messaging 237). This message contains N2 parameters that include the Selected PLMN ID and the Establishment cause.

At Step 7, a mutual authentication and key agreement procedure takes place, e.g., as specified in 3GPP TS 33.501 (see messaging 239). At Step 8a, the AMF 215 determines the Allowed NSSAI for this UE 205 (see block 241), e.g., determines that the UE 205 is allowed to use S-NSSAI-c. This can be determined by using the UE 205 subscription data received from UDM.

Continuing on FIG. 2B, at Step 8b the AMF 215 also determines that the N3IWF-1 211 does not support S-NSSAI-c, which is allowed for the UE 205, but there is another N3IWF (N3IWF-2 213) connected to the same AMF 215 that supports S-NSSAI-c (see block 243). Note that, as specified in 3GPP TS 38.413, when an N3IWF sets up the N2 connection with an AMF 215, the N3IWF indicates the supported list of S-NSSAIs. This way, the AMF 215 knows the list of S-NSSAIs supported by every N3IWF connected to the AMF 215.

In the depicted procedure, it is assumed that the selected AMF 215 supports the S-NSSAI-c allowed for the UE 205, thus AMF 215 relocation is not need. If, however, AMF 215 relocation is needed, the AMF 215 relocation is executed (based on the procedures specified in 3GPP TS 23.502) before the N3IWF relocation that is carried out below.

At Step 9, the AMF 215 sends a N3IWF Relocation Command to N3IWF-1 211 (see messaging 245). In this message, the AMF 215 includes the address of N3IWF-2 213 (which should be used for this UE 205, instead of N3IWF-1 211) and an AMF 215 identity, e.g., a Globally Unique AMF 215 Identifier (GUAMI) or an IP address of AMF 215. In some embodiments, the N3IWF Relocation Command also contains a Security Mode Control (SMC) Request message (i.e., SECURITY MODE COMMAND message), in order to establish a NAS security context for this UE 205 and protect further NAS messages. The N3IWF-1 211 forwards to UE 205 the received SMC Request message, the N3IWF-2 213 address and the AMF 215 identity, inside an EAP 5G-NAS packet (see messaging 247). Note that in alternative embodiments, e.g., when the SMC procedure is not executed, the N3IWF Relocation Command does not contain an SMC Request or any other NAS message.

At Step 10, because the UE 205 receives an N3IWF address in step 9b, the UE 205 determines that is should select another N3IWF. Therefore, the UE 205 sends an EAP 5G-Stop packet (see messaging 249), which (as specified in 3GPP TS 24.502) triggers the N3IWF-1 211 to terminate the ongoing IKE procedure by sending an IKE INFORMATIONAL Request message containing an EAP-Failure and an appropriated error cause (see messaging 251).

After this step, the N3IWF-1 211 may release the N2 connection with the AMF 215. However, since the release of the N2 connection may affect the ongoing UE registration procedure, the N3IWF-1 211 may delay the release of the N2 connection with the AMF 215 or may wait from AMF 215 to release the N2 connection after N3IWF-2 213 has established another N2 connection with the AMF 215 and the UE registration procedure can be resumed.

At Steps 11-12, the UE 205 starts the establishment of an NWu connection with the N3IWF address received in step 9b. First, the UE 205 initiates a new IKE procedure towards the N3IWF-2 213 (see block 253), so the steps 2, 3, 4 are repeated (here labelled as steps 11, 12a, 12b) but now between the UE 205 and N3IWF-2 213 (see messaging 255, 257, and 259).

At Step 13, the UE 205 sends an IKE_AUTH Request to N3IWF-2 213 (see messaging 261), which includes an EAP-Response/5G-NAS packet that contains the AN-Params and a SMC Complete message (i.e., SECURITY MODE COMPLETE), which is a response to the SMC Request message received in step 9b. In alternative embodiments, e.g., when the SMC procedure is not executed, the EAP packet sent by the UE 205 does not contain an SMC Response or any other NAS message.

The AN-Params contains a UE identity (e.g., SUCI or 5G-GUTI), an Establishment cause, (optionally) a Requested NSSAI, and the AMF 215 identity received in step 9b. The presence of the AMF 215 identity in this message indicates to N3IWF-2 213 that this message is sent to trigger relocation to N3IWF-2 213. Alternatively, the Establishment cause may contain a value that indicates to N3IWF-2 213 that this message is sent to trigger relocation to N3IWF-2 213.

Note here that, although the UE 205 reconnected to a new N3IWF, the NAS registration procedure between the UE 205 and the AMF 215 is resumed via the new N3IWF (i.e., N3IWF-2 213). Importantly, the registration procedure is not re-started due to the N3IWF relocation.

Continuing on FIG. 2C, at Step 14 the N3IWF-2 213 selects the same AMF 215 based on the received AMF 215 identity (see block 263) and sends a N3IWF Relocation Notify message to the AMF 215 (see messaging 265). In some embodiments, the N3IWF-2 213 forwards a SMC Complete message to the AMF 215 inside the N3IWF Relocation Notify message. In alternative embodiments, e.g., when the SMC procedure is not executed, the N3IWF Relocation Notify does not contain an SMC Complete or any other NAS message.

The N3IWF Relocation Notify message contains the UE identity so that the AMF 215 can identify the appropriate UE context (e.g., associate the received SMC Complete message with the UE 205) and resume the ongoing registration procedure for this UE 205. The N3IWF Relocation Notify message creates a new N2 connection associated with the UE 205. Note that the N3IWF-2 213 decides to send a N3IWF Relocation Notify message to AMF 215 (and not an Initial UE 205 Message) because it determines that the message in step 13 is sent to trigger a relocation to N3IWF-2 213.

After the AMF 215 receives the N3IWF Relocation Notify from N3IWF-2 213, the AMF 215 may have two different N2 connections associated with the same UE 205:

one with N3IWF-1 211 setup in Step 6*b* and another with N3IWF-2 213 setup in Step 14*b*. Therefore, the AMF 215 is expected to release the N2 connection with N3IWF-1 211, which is not required anymore. The messages exchanged for releasing this N2 connection are not shown in FIG. 2C.

Note that the AMF 215 ignores the N3IWF Relocation Notify if it has not previously sent an N3IWF Relocation Command for this UE 205.

At Step 15, the AMF 215 sends an Initial Context Setup Request to N3IWF-2 213 in order to setup a secure connection with the UE 205 (see messaging 267). This message includes the N3IWF key that should be used to authenticate the UE 205. As a response, the N3IWF-2 213 sends an EAP-Success packet to UE 205 inside an IKE_AUTH Response, which concludes the EAP-5G session initiated in step 12*b* (see messaging 269).

At Step 18, IKE_AUTH Request/Response messages are exchanged but this time with the AUTH payload, which is derived based on the common N3IWF key created in the UE 205 and in the 5GC network (see messaging 271 and 273). Note that the UE identity (e.g., SUCI or 5G-GUTI) received by N3IWF-2 213 in step 18*a* indicates to N3IWF-2 213 which N3IWF key (i.e., the one received in step 15*a*) should be used to authenticate the UE 205. After the successful authentication in step 18, a secure IPsec SA is created between the UE 205 and the N3IWF-2 213. At Step 19, the UE 205 establishes a TCP connection with N3IWF-2 213 (e.g., as specified in 3GPP TS 23.502), which completes the establishment of the NWu connection between the UE 205 and the N3IWF-2 213 (see messaging 275).

At Step 20, after the NWu connection between the UE 205 and the N3IWF-2 213 is established, the N3IWF-2 213 responds to AMF 215 with an Initial Context Setup Response message, indicating that a secure connection with the UE 205 has been established (see messaging 277). At Step 21, the AMF 215 sends a DL NAS Transport to N3IWF-2 213 containing a Registration Accept message for the UE 205 (see messaging 279). At Step 22, the Registration Accept message is forwarded to UE 205 inside the established NWu connection (see messaging 281).

After the above signaling flow the UE registration to 5G core network 217 is completed and the initially selected N3IWF-1 211 is relocated to N3IWF-2 213, which supports the NSSAI allowed for the UE 205.

Figure 3A:
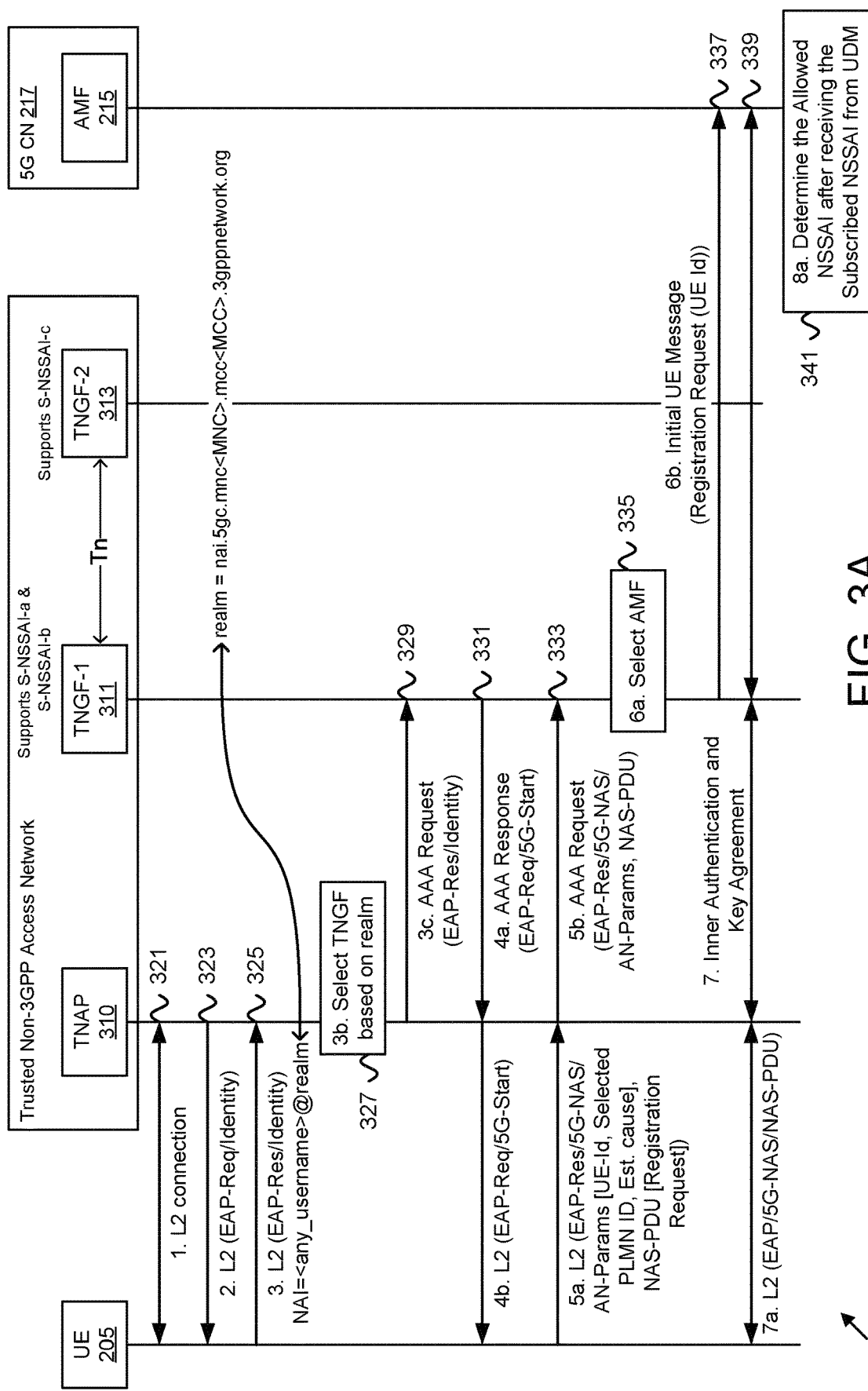
FIG. 3A is a signal flow diagram illustrating one embodiment of a procedure for TNGF relocation during UE relocation.
Figure 3B:
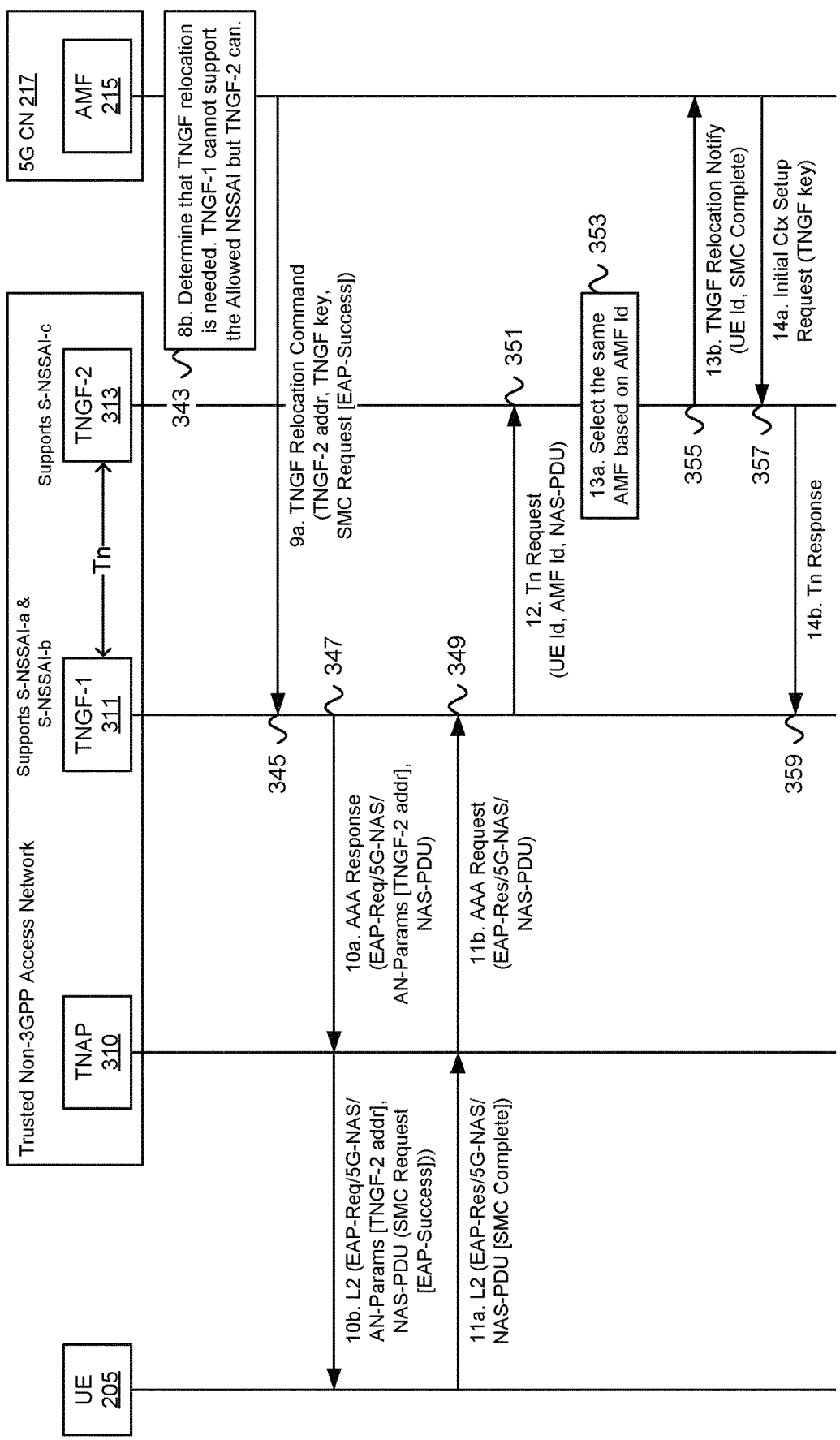
FIG. 3B is a continuation of the procedure depicted in FIG. 3A.
Figure 3C:
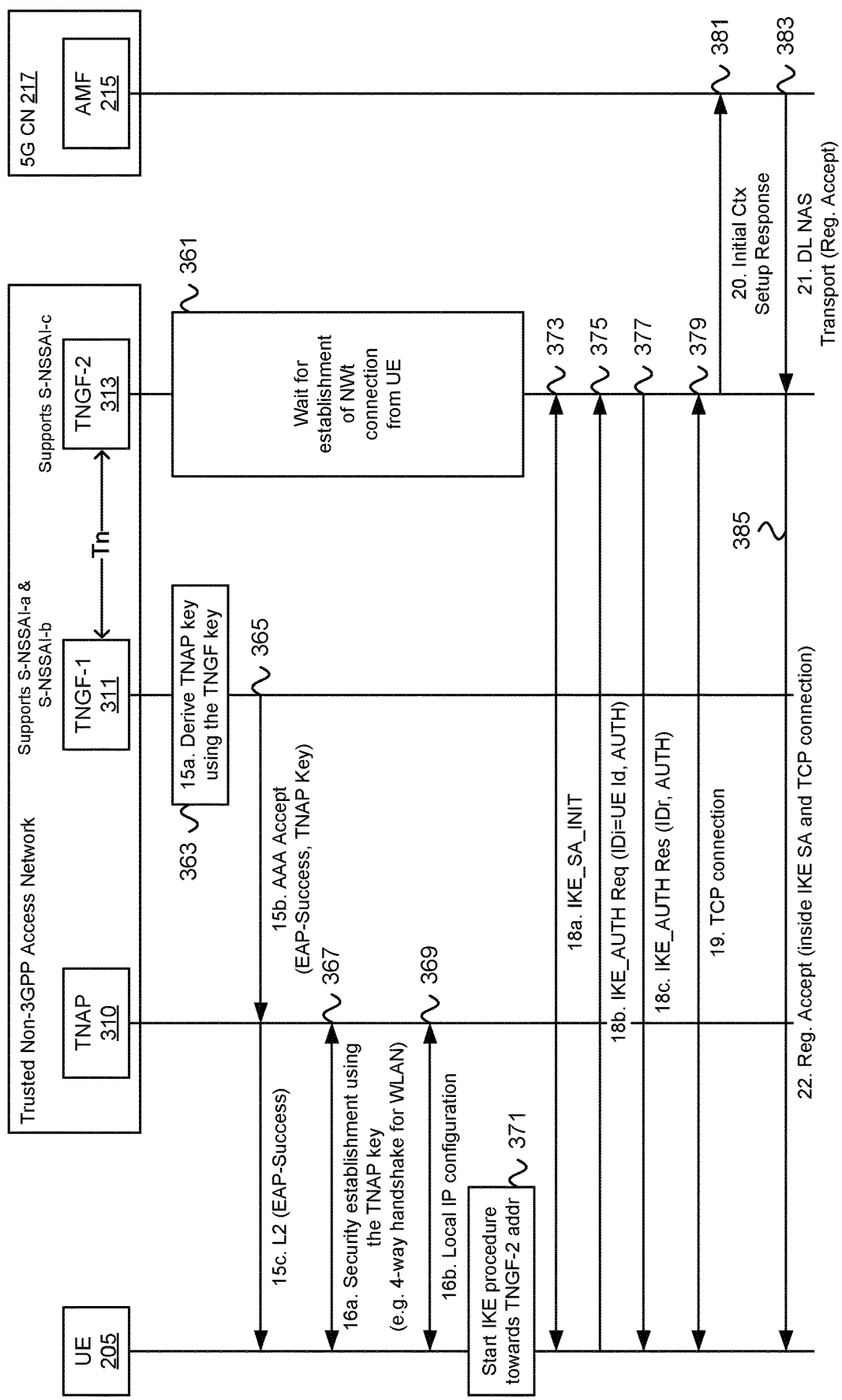
FIG. 3C is a continuation of the procedure depicted in FIG. 3B.

FIGS. 3A-3C depict a procedure 300 for relocating an access gateway during UE registration, according to embodiments of the disclosure. The procedure 300 involves the UE 205 (e.g., one embodiment of the remote unit 105), a first TNGF ("TNGF-1") 311, a second TNGF ("TNGF-2") 313, and the AMF 215 in the 5G core network 217. The procedure 300 details signaling flow of a modified registration procedure for a scenario where a UE 205 attempts to register with a 5G core network 217 via a trusted non-3GPP access network. Here, the trusted non-3GPP access network supports connectivity (e.g., 'Tn' interface) between the TNGF-1 311 and the TNGF-2 313. Similar steps take place in other scenarios, e.g., when the UE 205 attempts to perform a Service Request, instead of a Registration Request.

FIG. 3A depicts a second network deployment where the non-3GPP access network is a trusted non-3GPP access point 210 and the UE 205 initiates registration with the 5G core network 217 using a first TNGF ("TNGF-1") 217. During the registration, the AMF 230 determines that the TNGF-1 217 is unsuitable and relocates the registration to a second TNGF ("TNGF-2") 219. Details of the TNGF relocation are described below with reference to FIGS. 4A-4C.

Referring to FIG. 3A, the procedure 300 begins as the UE 205 decides to connect to a specific 5G PLMN via an available non-3GPP access network. The UE 205 discovers a non-3GPP access network supporting 5G connectivity (or "trusted" connectivity) to this 5G PLMN, thus, it selects this "trusted" non-3GPP access network and initiates a registration procedure for trusted non-3GPP access, e.g., as specified in 3GPP TS 23.502, clause 4.12a.2.2. In the most typical case, the trusted non-3GPP access network is a WLAN access network complying with the IEEE 802.11 specification.

At Step 1, the UE 205 establishes a Layer-2 (L2) connection with a Trusted Non-3GPP Access Point (TNAP) 310 in the trusted non-3GPP access network (see messaging 321). In the case of an IEEE 802.11 WLAN, this L2 connection corresponds to an 802.11 Association.

At Steps 2-3, an EAP procedure is initiated. EAP messages are encapsulated into Layer-2 packets, e.g., into IEEE 802.11/802.1x packets. The TNAP 310 requests the UE Identity and the UE 205 sends a Network Access Identifier ("NAI") as a response (see messaging 323, 325). The NAI provided by the UE 205 indicates that the UE 205 Requests "5G connectivity" to a specific PLMN, e.g., NAI="<any_username>@nai.5gc.mnc<MNC>.mcc <MCC>.3gppnetwork.org." This NAI triggers the TNAP 310 to select a TNGF (here the TNGF-1 311, see block 327) and send an AAA Request to the selected TNGF (see messaging 329). Between the TNAP 310 and the TNGF-1 311, each EAP packet is encapsulated into an AAA message.

Note that the TNGF-1 311 is selected in step 3*b* without considering any NSSAI information, hence, the selected TNGF-1 311 may not support the allowed NSSAI for this UE 205 (i.e., the NSSAI allowed by the UE 205's subscription) and a different TNGF may need to be used instead. In other words, the selected TNGF-1 311 may need to be relocated. The subsequent steps in this procedure specify how this relocation can be carried out. In the depicted embodiments, the TNGF-1 311 supports the S-NSSAI-a and S-NSSAI-b, but not does not support S-NSSAI-c. However, the TNGF-2 313 does support S-NSSAI-c.

At Step 4, the TNGF-1 311 responds with an AAA response message (see messaging 331), which includes an EAP-Request/5G-Start packet indicating to UE 205 that an EAP-5G session starts and the UE 205 can start sending NAS messages encapsulated within EAP-5G packets.

At Step 5, the UE 205 sends an EAP-Response/5G-NAS packet that contains Access Network parameters (AN-Params) and a Registration Request message (or a Service Request message, see messaging 333). The AN-Params contains a UE identity (e.g., SUCI or 5G-GUTI), the Selected PLMN identity and an Establishment cause. Optionally, a Requested NSSAI may also be contained if the UE 205 does not operate in the default NSSAI Inclusion mode D (specified in 3GPP TS 23.502). The Establishment cause provides the reason for Requesting a signaling connection with the 5G core network 217. The TNAP 310 forwards the EAP-Response/5G-NAS packet to TNGF-1 311 within an AAA Request message.

At Step 6, the TNGF-1 311 selects an AMF 215 in the 5G core network 217 of the selected PLMN based on the received AN-Params and local policy, e.g., as specified in 3GPP TS 23.501, clause 6.3.5 (see block 335). In turn, the TNGF-1 311 forwards the Registration Request (or the Service Request) received from the UE 205 to the selected AMF 215 within an N2 Initial UE 205 Message (see messaging 337). This message contains N2 parameters that include the Selected PLMN ID and the Establishment cause.

At Step 7, a mutual authentication and key agreement procedure takes place, e.g., as specified in 3GPP TS 33.501 (see messaging 339). At Step 8a, the AMF 215 determines the Allowed NSSAI for this UE 205 (see block 341), e.g., determines that the UE 205 is allowed to use S-NSSAI-c. This can be determined by using the UE 205 subscription data received from UDM.

Continuing at FIG. 3B, at Step 8b the AMF 215 also determines that the TNGF-1 311 does not support S-NSSAI-c, which is allowed for the UE 205, but there is another TNGF (TNGF-2 313) connected to the same AMF 215 that supports S-NSSAI-c (see block 343). Note that, as specified in 3GPP TS 38.413, when a TNGF sets up the N2 connection with an AMF 215, the TNGF indicates the supported list of S-NSSAIs. This way, the AMF 215 knows the list of S-NSSAIs supported by every TNGF connected to the AMF 215.

Here, it is assumed that the selected AMF 215 supports the S-NSSAI-c allowed for the UE 205, thus AMF 215 relocation is not need. If, however, AMF 215 relocation is needed, the AMF 215 relocation is executed (based on the procedures specified in 3GPP TS 23.502) before the TNGF relocation that is carried out below.

At Step 9, the AMF 215 sends a TNGF Relocation Command to TNGF-1 311 (see messaging 345). In this message, the AMF 215 includes the TNGF key and the address of TNGF-2 313, which should be used for this UE 205, instead of TNGF-1 311. In some embodiments, the TNGF Relocation Command also contains a Security Mode Control (SMC) Request message (i.e., SECURITY MODE COMMAND message), in order to establish a NAS security context for this UE 205 and protect further NAS messages.

At Step 10, the TNGF-1 311 forwards to UE 205 the received SMC Request message and the TNGF-2 313 address inside an EAP 5G-NAS packet (see messaging 347). Note that in alternative embodiments, e.g., when the SMC procedure is not executed, the TNGF Relocation Command does not contain an SMC Request or any other NAS message. The TNGF-2 313 address indicates to UE 205 the address towards which the NWt connection should be established. The TNGF key is used by TNGF-1 311 in step 15a to derive the TNAP key.

At Step 11, the UE 205 sends an EAP-Response/5G-NAS packet that contains an SMC Complete message (i.e., SECURITY MODE COMPLETE), which is a response to the SMC Request message received (see messaging 349). This packet is forwarded to TNGF-1 311.

At Step 12, because the TNGF-1 311 received a TNGF Relocation Command in step 9a, the TNGF-1 311 determines that the UE 205 should be relocated to TNGF-2 313. Thus, the TNGF-1 311 forwards the received SMC Response message to TNGF-2 313 by sending a Tn Request message to TNGF-2 313 (see messaging 351). In alternative embodiments, e.g., when the SMC procedure is not executed, the Tn Request message does not contain an SMC Request or any other NAS message.

The Tn Request message contains the UE identity (SUCI or 5G-GUTI) received in step 5b and an AMF 215 identity, e.g., a Globally Unique AMF 215 Identifier (GUAMI) or an IP address of AMF 215. If the AMF 215 identity is a GUAMI, then it is provided to TNGF-1 311, e.g., with the TNGF Relocation Command in step 9a.

At Step 13, the TNGF-2 313 selects the same AMF 215 based on the received AMF 215 identity (see block 353) and forwards the SMC Complete message to the AMF 215 inside a TNGF Relocation Notify message (see messaging 355). In alternative embodiments, e.g., when the SMC procedure is not executed, the TNGF Relocation Notify does not contain an SMC Complete or any other NAS message.

The TNGF Relocation Notify message contains the UE identity so that the AMF 215 can associate it with the appropriate UE 205 context and resume the ongoing registration procedure for this UE 205. The TNGF Relocation Notify message creates a new N2 connection associated with the UE 205.

After the AMF 215 receives the TNGF Relocation Notify message from TNGF-2 313, the AMF 215 has two different N2 connections associated with the same UE 205: one with TNGF-1 311 setup in step 6b and another with TNGF-2 313 setup in step 13b. Therefore, the AMF 215 is expected to release the N2 connection with TNGF-1 311, which is not required anymore. The messages exchanged for releasing this N2 connection are not shown in FIG. 3B. Note that the AMF 215 ignores the TNGF Relocation Notify if it has not previously sent a TNGF Relocation Command for this UE 205.

At Step 14, the AMF 215 sends an Initial Context Setup Request to TNGF-2 313 in order to (a) enable the completion of the EAP-5G session and to (b) enable the establishment of a NWt connection between the UE 205 and TNGF-2 313 (see messaging 357). This message includes the TNGF key which is also needed by TNGF-2 313. As a response, the TNGF-2 313 sends a Tn Response to TNGF-1 311 (see messaging 359).

Continuing on FIG. 3C, the TNGF-2 313 waits for the UE 205 to start the establishment of an NWt connection (see block 361). At Step 15 the TNGF-1 311 derives a TNAP key from the TNGF key (see block 363) and sends an EAP-Success packet to UE 205 inside an AAA Accept, which concludes the EAP-5G session initiated in step 4 (see messaging 365). The AAA Accept includes also the TNAP key, which should be used to establish air-interface security with the UE 205. Note that the TNGF-1 311 may execute steps 15a and 15b not after receiving the Tn Response (as shown in the figure) but after receiving the message in step 11b.

At Step 16, using the TNAP key (which is also derived by the UE 205 from the TNGF key), the UE 205 and the TNAP establish air-interface security (see messaging 367). In the case of an IEEE 802.11 WLAN, this corresponds to a 4-way handshake exchange. Subsequently, the UE 205 obtains IP configuration information, including an IP address.

At Step 18, the UE 205 starts the establishment of an NWt connection with the TNGF-2 313 address received (see block 371). First, the UE 205 initiates an IKE procedure towards TNGF-2 313 by starting an IKE initial exchange according to RFC 7296 (see messaging 373). Then, IKE_AUTH Request/Response messages are exchanged using the AUTH payload, which is derived based on the common TNGF key created in the UE 205 and in the 5GC network (see messaging 375 and 377). Note that the UE identity (e.g., SUCI or 5G-GUTI) received by TNGF-2 313 in step 18b indicates to TNGF-2 313 which TNGF key (i.e., the one received in step 15a) should be used to authenticate the UE 205. After the successful authentication in step 18, a secure IPsec SA is created between the UE 205 and the TNGF-2 313.

At Step 19, the UE 205 establishes a TCP connection with TNGF-2 313 (as specified in 3GPP TS 23.502), which completes the establishment of the NWt connection between the UE 205 and the TNGF-2 313 (see messaging 379).

At Step 20, after the NWt connection between the UE 205 and the TNGF-2 313 is established, the TNGF-2 313 responds to AMF 215 with an Initial Context Setup Response message, indicating that a secure connection with the UE 205 has been established (see messaging 381).

At Step 21, the AMF 215 sends a DL NAS Transport to TNGF-2 313 containing a Registration Accept message for the UE 205 (see messaging 383). At Step 22, the Registration Accept message is forwarded to UE 205 inside the established NWt connection (see messaging 385).

After the above signaling flow the UE registration to the 5G core network 217 is completed and the initially selected TNGF-1 311 is relocated to TNGF-2 313, which supports the NSSAI allowed for the UE 205.

Figure 4A:
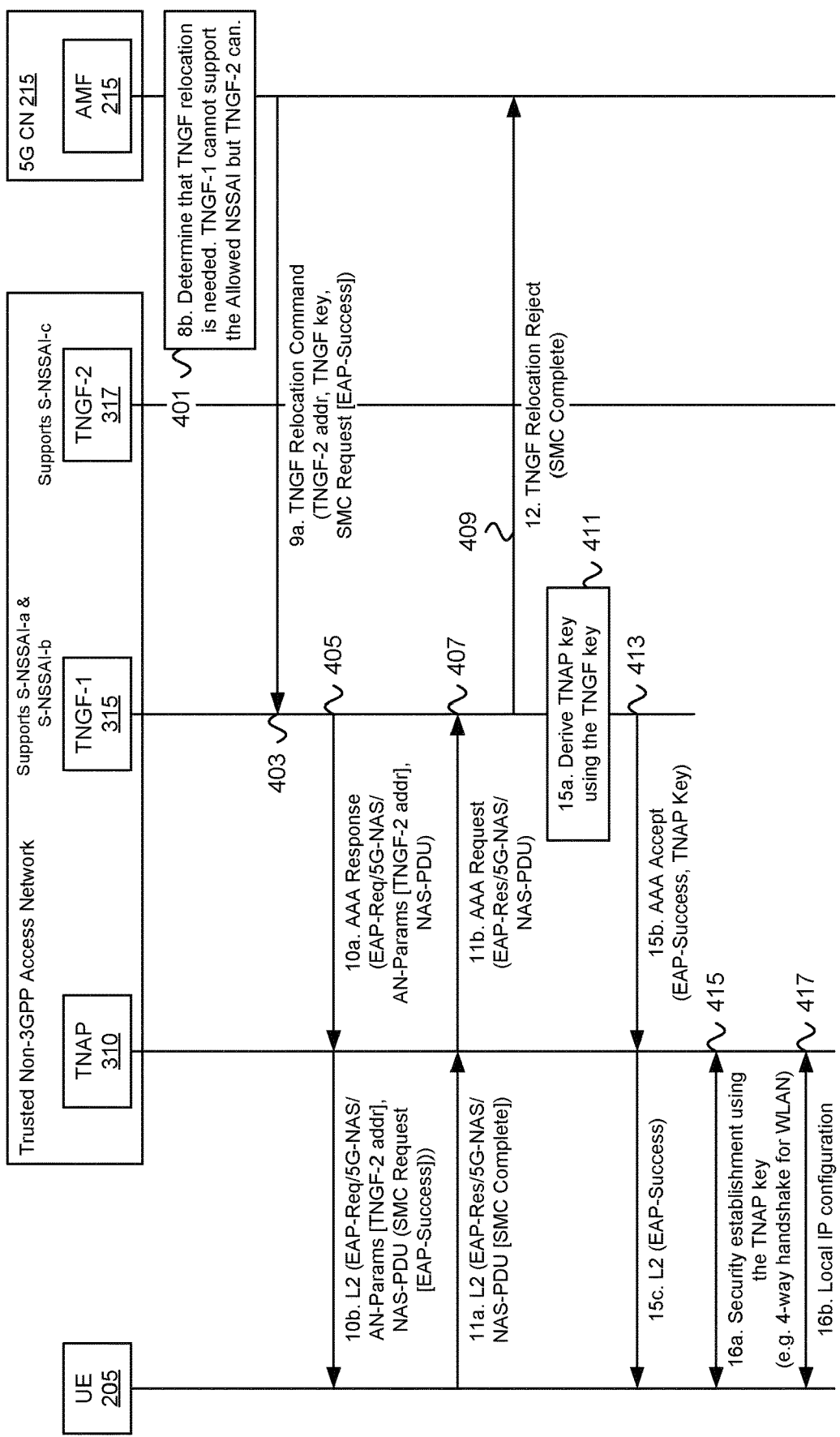
FIG. 4A is a signal flow diagram illustrating another embodiment of a procedure for TNGF relocation during UE relocation and is a continuation of the procedure depicted in FIG. 3A.
Figure 4B:
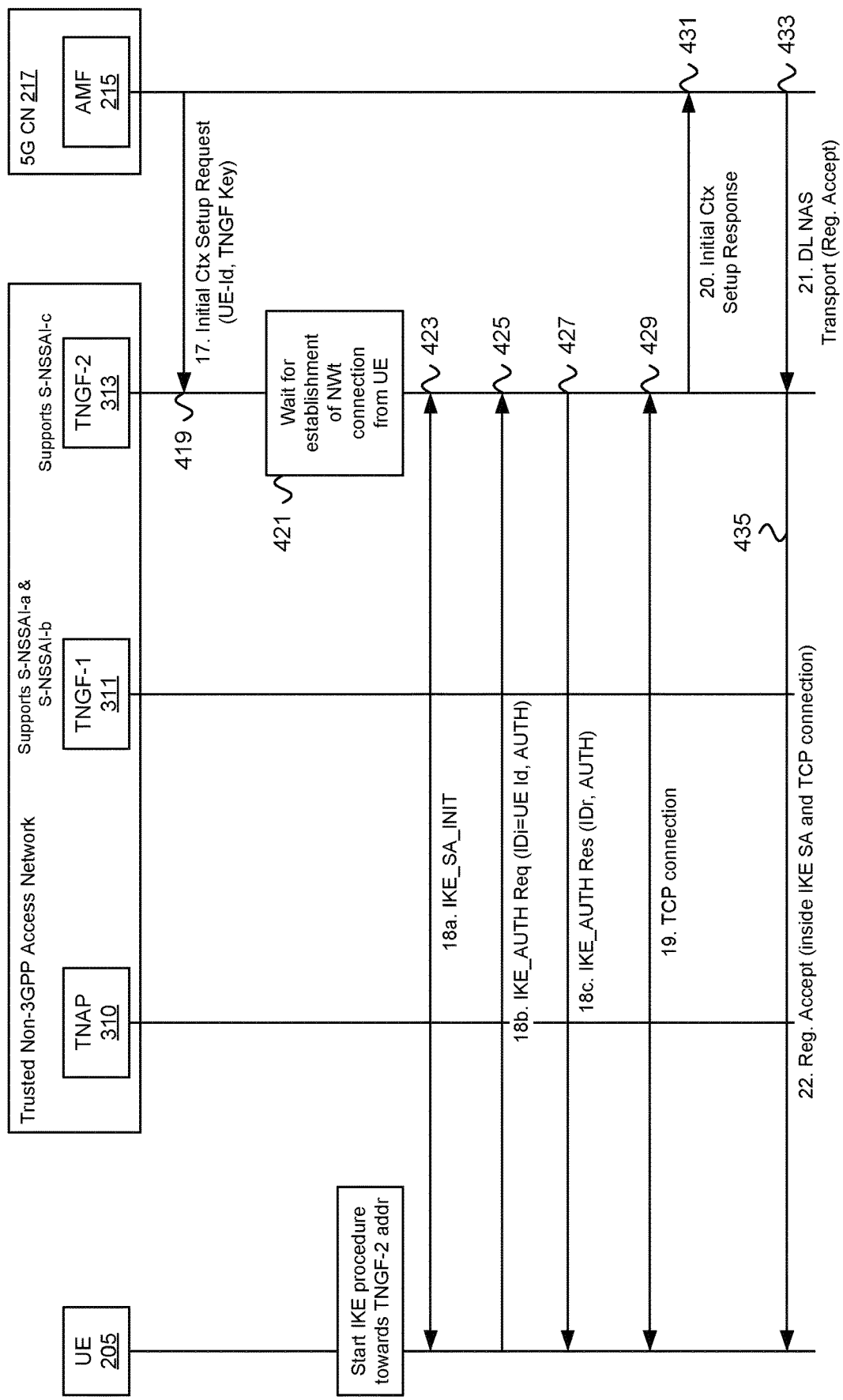
FIG. 4B is a continuation of the procedure depicted in FIG. 4A.

FIGS. 4A-4B depict a procedure 400 for relocating an access gateway during UE registration, according to embodiments of the disclosure. The procedure 400 involves the UE 205 (e.g., one embodiment of the remote unit 105), the TNGF-1 311, the TNGF-2 313, and the AMF 215 in the 5G core network 217. The procedure 400 details signaling flow for a scenario where a UE 205 attempts to register with a 5G core network 217 via a trusted non-3GPP access network. Here, however, the TNAN 215 does not support connectivity between the TNGF-1 311 and the TNGF-2 313 (e.g., the 'Tn' interface is not supported). Similar steps take place in other scenarios, e.g., when the UE 205 attempts to perform a Service Request, instead of a Registration Request. Note that FIG. 4A is a continuation of FIG. 3A.

Referring to FIG. 4A, the procedure 400 begins after the UE 205 and TNGF-1 311 initiate registration in the 5G core network 217 and the AMF 215 has already determined the Allowed NSSAI (see e.g., Step 8a of FIG. 3A).

At Step 8b, the AMF 215 determines that the TNGF-1 311 does not support S-NSSAI-c, which is allowed for the UE 205, but there is another TNGF (TNGF-2 313) connected to the same AMF 215 that supports S-NSSAI-c (see block 401). Note that, as specified in 3GPP TS 38.413, when a TNGF sets up the N2 connection with an AMF 215, the TNGF indicates the supported list of S-NSSAIs. This way, the AMF 215 knows the list of S-NSSAIs supported by every TNGF connected to the AMF 215.

In the depicted embodiments, is assumed that the selected AMF 215 supports the S-NSSAI-c allowed for the UE 205, thus AMF 215 relocation is not need. If, however, AMF 215 relocation is needed, the AMF 215 relocation is executed (based on the procedures specified in 3GPP TS 23.502) before the TNGF relocation that is carried out below.

At Step 9, the AMF 215 sends a TNGF Relocation Command to TNGF-1 311 (see messaging 403). In this message, the AMF 215 includes the TNGF key and the address of TNGF-2 313, which should be used for this UE 205, instead of TNGF-1 311. In some embodiments, the TNGF Relocation Command also contains a Security Mode Control (SMC) Request message (i.e., SECURITY MODE COMMAND message), in order to establish a NAS security context for this UE 205 and protect further NAS messages.

At Step 10, the TNGF-1 311 forwards to UE 205 the received SMC Request message and the TNGF-2 313 address inside an EAP 5G-NAS packet (see messaging 405). Note that in alternative embodiments, e.g., when the SMC procedure is not executed, the TNGF Relocation Command does not contain an SMC Request or any other NAS message. The TNGF-2 313 address indicates to the UE 205 the address towards which the NWt connection should be established. The TNGF key is used by TNGF-1 311 in step 15a to derive the TNAP key.

At Step 11, the UE 205 sends an EAP-Response/5G-NAS packet that contains an SMC Complete message (i.e., SECURITY MODE COMPLETE), which is a response to the SMC Request message received (see messaging 407). This packet is forwarded to TNGF-1 311.

At Step 12, because the TNGF-1 311 does not support a Tn interface with TNGF-2 313, the TNGF-1 311 forwards the SMC Response message to AMF 215 within a TNGF Relocation Reject message (see messaging 409). In alternative embodiments, e.g., when the SMC procedure is not executed, the TNGF Relocation Reject does not contain an SMC Complete or any other NAS message. After receiving the TNGF Relocation Reject message from TNGF-1 311, the AMF 215 determines that no Tn interface is supported. This triggers the AMF 215 to perform step 17 below.

At Step 15, the TNGF-1 311 derives a TNAP key from the TNGF key (see block 411) and sends an EAP-Success packet to UE 205 inside an AAA Accept, which concludes the EAP-5G session initiated in step 4 (see messaging 413). The AAA Accept includes also the TNAP key, which should be used to establish air-interface security with the UE 205.

At Step 16, using the TNAP key (which is also derived by the UE 205 from the TNGF key), the UE 205 and the TNAP establish air-interface security (see messaging 415). In the case of an IEEE 802.11 WLAN, this corresponds to a 4-way handshake exchange. Subsequently, the UE 205 obtains IP configuration information, including an IP address (see messaging 417).

Continuing at FIG. 4B, at Step 17, because the AMF 215 determined (in step 12) that no Tn interface is supported, the AMF 215 sends an Initial Context Setup Request to TNGF-2 313 in order to enable the establishment of a NWt connection between the UE 205 and TNGF-2 313 (see messaging 419). This message includes the TNGF key that should be used to authenticate the UE 205 and the UE identity (e.g., SUCI or 5G-GUTI). As a response, the TNGF-2 313 waits for the UE 205 to start the establishment of an NWt connection (see block 421).

After the AMF 215 sends the Initial Context Setup Request to TNGF-2 313, the AMF 215 has two different N2 connections associated with the same UE 205: one with TNGF-1 311 setup in step 6b and another with TNGF-2 313 setup in step 17. Therefore, the AMF 215 is expected to release the N2 connection with TNGF-1 311, which is not required anymore. The messages exchanged for releasing this N2 connection are not shown in FIG. 4B.

At Step 18, the UE 205 starts the establishment of an NWt connection with the TNGF-2 313 address received in step 9c (see messaging 423, 425, and 427). At Step 19, the UE 205 establishes a TCP connection with TNGF-2 313 (as specified in 3GPP TS 23.502), which completes the establishment of the NWt connection between the UE 205 and the TNGF-2 313 (See messaging 429). Details of establishing an NWt connection are discussed above with reference to FIG. 3C.

At Step 20, after the NWt connection between the UE 205 and the TNGF-2 313 is established, the TNGF-2 313 responds to AMF 215 with an Initial Context Setup Response message, indicating that a secure connection with the UE 205 has been established (see messaging 431). At Step 21, the AMF 215 sends a DL NAS Transport to TNGF-2 313 containing a Registration Accept message for the UE 205 (see messaging 433). At Step 22, the Registration Accept message is forwarded to UE 205 inside the established NWt connection (see messaging 435).

After the above signaling flow the UE registration to the 5G core network 217 is completed and the initially selected TNGF-1 311 is relocated to TNGF-2 313, which supports the NSSAI allowed for the UE 205.

Figure 5:
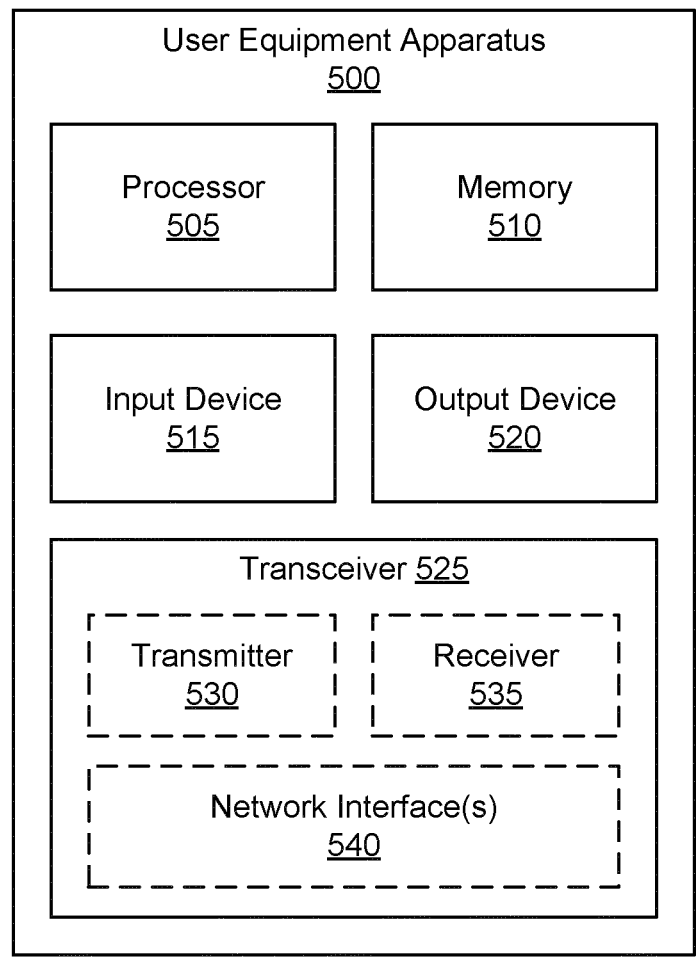
FIG. 5 is a block diagram illustrating one embodiment of a user equipment apparatus for relocating an access gateway during UE registration.

FIG. 5 depicts one embodiment of a user equipment apparatus 500 that may be used for relocating an access gateway during UE registration, according to embodiments of the disclosure. The user equipment apparatus 500 may be one embodiment of the remote unit 105 and/or the UE 205. Furthermore, the user equipment apparatus 500 may include a processor 505, a memory 510, an input device 515, an output device 520, a transceiver 525. In some embodiments, the input device 515 and the output device 520 are combined into a single device, such as a touch screen. In certain embodiments, the user equipment apparatus 500 does not include any input device 515 and/or output device 520.

As depicted, the transceiver 525 includes at least one transmitter 530 and at least one receiver 535. Here, the transceiver 525 communicates with a mobile core network (e.g., a 5GC) via an access network. Additionally, the transceiver 525 may support at least one network interface 540. Here, the at least one network interface 540 facilitates communication with an non-3GPP access point (e.g., using the "NWu" or "NWt" interfaces). Additionally, the at least one network interface 540 may include an interface used for communications with an AMF, an SMF, and/or a UPF.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment 500 to implement the above described UE behaviors. In some embodiments, the processor 505 selects a first N3IWF for registering with a mobile communication network via the first N3IWF. Selecting the first N3IWF is discussed above with reference to FIG. 2A (see step 1*b*). The processor 505 sends a first message to the first N3IWF that initiates a first registration procedure with the mobile communication network. Here, the first message may contain a NAS message, such as a Registration Request message, as discussed above with reference to FIG. 2A (see step 5).

Via the transceiver 525, the processor 505 receives a first response from the first N3IWF. Here, the first response contains an address of a second N3IWF and an identity of an AMF (AMF-Id) in the mobile communication network, as discussed above with reference to FIG. 2A (see step 9*b*). The processor 505 sends a second message to the first N3IWF, the second message indicating that the first registration procedure via the first N3IWF is to be stopped, as discussed above with reference to FIG. 2A (see step 10*a*).

The processor 505 sends a third message to the second N3IWF. Here, the third message indicating that the first registration is to be relocated to the second N3IWF. In certain embodiments, the indication in the third message is the combination of the AMF-Id and/or a specific Establishment Cause (i.e., 'Relocation'). The processor 505 completes the first registration procedure via the second N3IWF, as discussed above with reference to FIG. 2A (see steps 15-21).

In some embodiments, the first message comprises an identity of the mobile communication network (i.e., Selected PLMN ID) and an establishment cause, as discussed above with reference to FIG. 2A (see step 5). In certain embodiments, the establishment cause indicates that the first registration is to be relocated to the second N3IWF. In some embodiments, the first response is received after mutual authentication and key agreement, as discussed above with reference to FIG. 2A (see step 7). In some embodiments, the third message comprises a second NAS message that resumes the first registration procedure via the second N3IWF. In various embodiments, the first NAS message comprises a Registration Request, wherein the second NAS message comprises a SMC Complete message.

In some embodiments, the third message contains the identity of the AMF, wherein the identity of the AMF indicates that the first registration is to be relocated to the second N3IWF, and wherein the identity of the AMF is used by the second N3IWF to select the same AMF selected by the first N3IWF. In some embodiments, completing the registration with the mobile communication network via the second N3IWF includes establishing an NWu connection with the second N3IWF and receiving a Registration Accept via the established NWu connection.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to relocating an access gateway during UE registration, for example storing security keys, IP addresses, and the like. In certain embodiments, the memory 510 also stores program code and related data, such as an operating system ("OS") or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
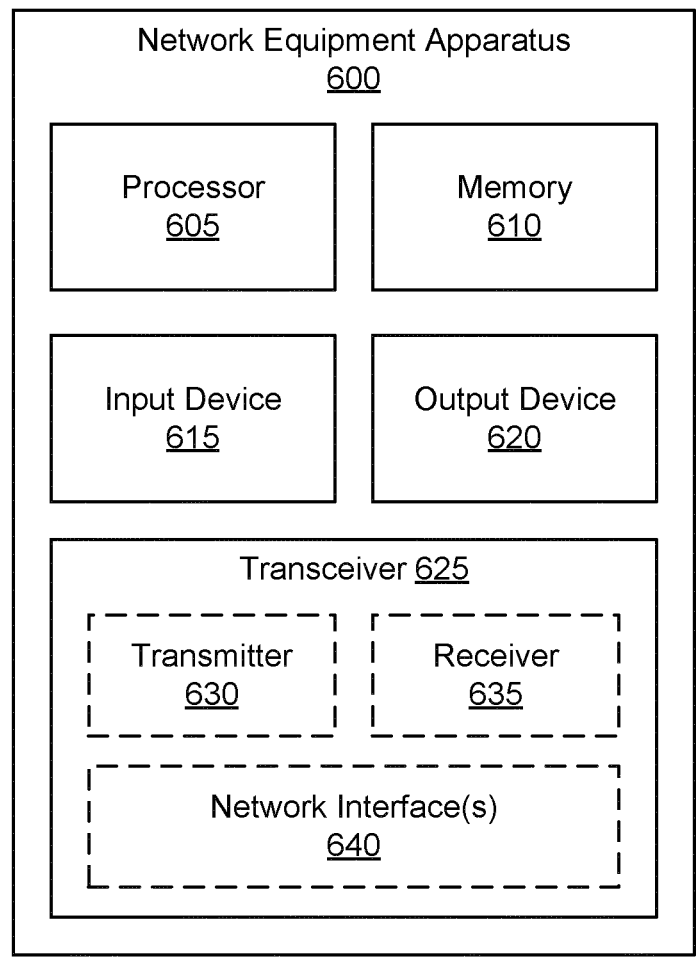
FIG. 6 is a block diagram illustrating one embodiment of a network equipment apparatus for relocating an access gateway during UE registration.

FIG. 6 depicts one embodiment of a network equipment apparatus 600 that may be used for relocating an access gateway during UE registration, according to embodiments of the disclosure. In some embodiments, the network equipment apparatus 600 may be one embodiment of a TNGF. In other embodiments, the network equipment apparatus 600 may be one embodiment of an AMF. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105. Additionally, the transceiver 625 may support at least one network interface 640, such as the NWu interface depicted in FIG. 1. In some embodiments, the transceiver 625 supports a first interface for communicating with a RAN node, a second interface for communicating with one or more network functions in a mobile core network (e.g., a 6GC) and a third interface for communicating with a remote unit (e.g., UE).

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the first transceiver 625.

In various embodiments, the processor 605 controls the network equipment apparatus 600 to implement the above described TNGF-1 behaviors. In some embodiments, the processor 605 initiates registration of the UE with the mobile communication network and receives a relocation command from an AMF while the registration is ongoing. Here, the relocation command contains an address of a first TNGF (i.e., the TNGF-2) and a first security key.

The processor 605 determines whether connectivity with the first TNGF is supported. If connectivity with the first TNGF is supported, then the processor 605 sends a first request to the first TNGF, the first request containing a UE identity and an AMF identity, as discussed above with reference to FIG. 3B (see step 12). However, if connectivity with the first TNGF is not supported, then the processor 605 sends a relocation reject message to the AMF, as discussed above with reference to FIG. 4A (see step 12).

In some embodiments, the processor 605 initiates registration of the UE with the mobile communication network by sending an Extensible Authentication Protocol 5G ("EAP-5G") packet to the UE containing a Start indication, as discussed above with reference to FIG. 3A (see step 4). In such embodiments, the processor 605 further relays at least one NAS message between the UE and the AMF. In some embodiments, the processor 605 forwards the address of the first TNGF to the UE prior to sending the first request to the first TNGF or sending the relocation reject message to the AMF.

In some embodiments, the relocation command includes a SMC Request, wherein the processor 605 forwards the SMC Request and the address of the first TNGF to the UE prior to sending the first request to the first TNGF or sending the relocation reject message to the AMF, and wherein the processor 605 receives a message from the UE in response to forwarding the SMC Request, the message from the UE containing a SMC Response.

In certain embodiments, the first request includes the SMC Response, wherein the processor 605 receives a first response from the first TNGF, wherein the processor 605 generates a second security key using the first security key and forwards the second security key to an access point serving the UE in the non-3GPP access network. In other embodiments, the relocation reject message includes an SMC Response. In various embodiments, the SMC Request is a SECURITY MODE COMMAND message and the SMC Response is a SECURITY MODE COMPLETE message.

In some embodiments, the relocation command containing the address of the first TNGF indicates that the first TNGF is selected to resume the registration of the UE with the mobile communication network. In certain embodiments, the first TNGF is selected to resume the registration of the UE with the mobile communication network, in response to determining at the AMF that the network equipment apparatus 600 does not support an allowed set of network slices (e.g., Allowed NSSAI) for the UE, wherein the first TNGF supports the allowed set of network slices (Allowed NSSAI).

In some embodiments, the relocation command contains the AMF identity. In one embodiment, the AMF identity is a GUAMI. In another embodiment, the AMF identity is an IP address of the AMF. Note that if the AMF identity in the first request is a GUAMI (not an IP address), then the GUAMI must be provided by the AMF.

In various embodiments, the processor 605 controls the network equipment apparatus 600 to implement the above described TNGF-2 behaviors. Here, the processor 605 receives a first request from a first TNGF (i.e., the TNGF-1), the first request containing a UE identity and an AMF identity. Here, the first TNGF initiated registration of the UE with the mobile communication network, as discussed above with reference to FIG. 3B (see step 12).

The processor 605 selects an AMF in the mobile communication network using the AMF identity, as discussed above with reference to FIG. 3B (see step 13a) and sends a relocation notify message to the AMF, the relocation notify message containing the UE identity. Here, the relocation notify message indicates that the registration of the UE with the mobile communication network is to be resumed via the network equipment apparatus 600. The processor 605 receives a second request from the AMF containing a security key (i.e., the TNGF key) in response to sending the relocation notify message, as discussed above with reference to FIG. 3B (see step 14a), sends a first response to the first TNGF, as discussed above with reference to FIG. 3C (see step 14d), and establishes secure connectivity (e.g., IPsec SA) with the UE by applying the security key, as discussed above with reference to FIG. 3C (see steps 18, 19).

In some embodiments, the first request contains a SMC Request message, wherein the relocation notify message sent to the AMF contains the SMC Request message. In various embodiments, the SMC Request is a SECURITY MODE COMMAND message. In some embodiments, the processor 605 sends a second response to the AMF in response to establishing secure connectivity with the UE, as discussed above with reference to FIG. 3C (see step 20).

In some embodiments, the processor 605 further completes the registration of the UE with the mobile communication network in response to establishing the secure connectivity with the UE. In some embodiments, the first TNGF does not support an allowed set of network slices (e.g., Allowed NSSAI) for the UE, wherein the network equipment apparatus 600 supports the allowed set of network slices (Allowed NSSAI).

In various embodiments, the processor 605 controls the network equipment apparatus 600 to implement the above described AMF behaviors. In some embodiments, the processor 605 receives a first request from a first access gateway (e.g., the TNGF-1 or the N3IWF-1), the first request including a first NAS message (e.g., a Registration Request) from a UE, the first NAS message initiating registration of the UE with the mobile communication network via the first access gateway, as discussed above with reference to FIG. 3A (see step 6b). The processor 605 determines to relocate the registration of the UE to a second access gateway (e.g., the TNGF-2 or the N3IWF-2). Here, the second access gateway is to resume registration of the UE, as discussed above with reference to FIGS. 3B and 4A (see step 8). The processor 605 sends a relocation command to the first access gateway, the relocation command including an address of the second access gateway, as discussed above with reference to FIGS. 3B and 4A (see step 9a) and relocates the registration of the UE to the second access gateway in response to sending the relocation command.

In some embodiments, the relocation command includes a SMC Request message for the UE, wherein the processor 605 receives a relocation notify message from the second access gateway, the relocation notify message containing a SMC Response message from the UE. In various embodiments, the SMC Request is a SECURITY MODE COMMAND message and the SMC Response is a SECURITY MODE COMPLETE message.

In some embodiments, the first access gateway is a first TNGF in the non-3GPP access network, wherein the second access gateway is a second TNGF in the non-3GPP access network, and wherein relocating the registration of the UE uses a procedure selected based on whether connectivity between the first TNGF and the second TNGF is supported. In such embodiments, the processor 605 relocates the registration of the UE to the second TNGF by determining that connectivity between the first TNGF and the second TNGF is not supported, wherein the processor 605 determines that connectivity between the first TNGF and the second TNGF is not supported in response to receiving a relocation reject message from the first TNGF in response to sending the relocation command message.

In some embodiments, the relocating the registration of the UE to the second TNGF includes sending an Initial Context Setup Request message to the second TNGF containing a UE identity and a security key, in response to determining that connectivity between the first TNGF and the second TNGF is not supported, as discussed above with reference to FIG. 4A (see step 17). In certain embodiments, the processor 605 releases connectivity with the first TNGF after sending the Initial Context Setup Request message to the second TNGF.

In some embodiments, the relocating the registration of the UE to the second TNGF further comprises: receiving a notification message (e.g., TNGF Relocation Notify) from the second TNGF, wherein the notification message indicates that connectivity between the first TNGF and the second TNGF is supported, as discussed above with reference to FIG. 3B (see step 14b), and sending an Initial Context Setup Request to the second TNGF containing a security key in response to receiving the notification message. In certain embodiments, the processor 605 releases connectivity with the first TNGF after receiving the notification message from the second TNGF.

In some embodiments, the first access gateway is a first N3IWF in the non-3GPP access network, wherein the second access gateway is a second N3IWF in the non-3GPP access network, and wherein the relocation command includes an AMF identity of the network equipment apparatus 600. In certain embodiments, the identity of the AMF is used by the second N3IWF to select the same AMF selected by the first N3IWF.

In some embodiments, the processor 605 relocates the registration of the UE to the second N3IWF by: receiving a notification message (e.g., N3IWF Relocation Notify) from the second N3IWF, as discussed above with reference to FIG. 3B (see step 13b), wherein the notification message indicates that the UE resumes registration via the second N3IWF, sending an Initial Context Setup Request to the second N3IWF containing a security key to be used for establishing a secure connection with the UE in response to receiving the notification message, as discussed above with reference to FIGS. 3C and 4B (see step 15a), and receiving a response from the second N3IWF confirming that the secure connection with the UE is established.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to relocating an access gateway during UE registration, for example storing security keys, IP addresses, UE contexts, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 140). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

Figure 7:
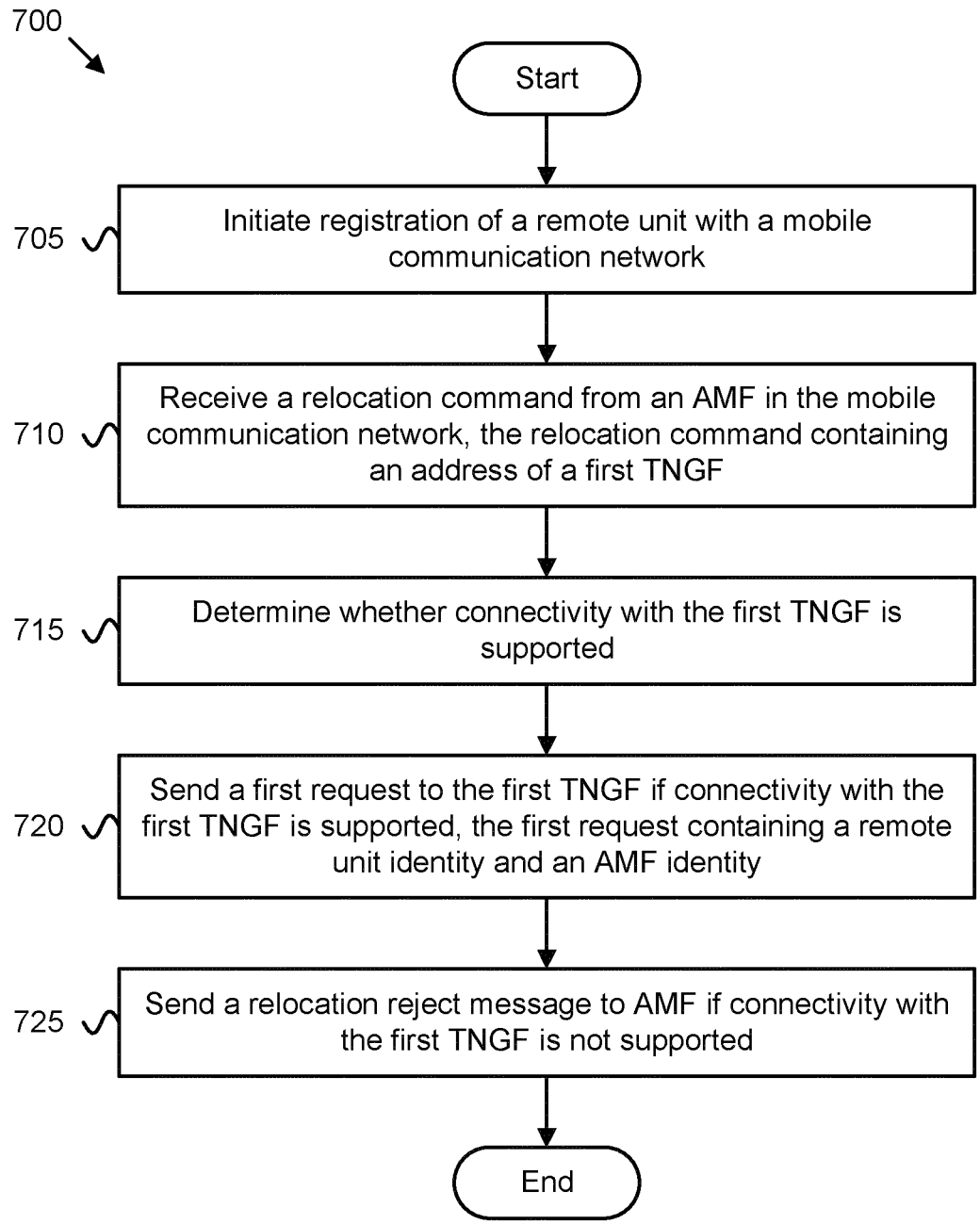
FIG. 7 is a flow chart diagram illustrating one embodiment of a first method for relocating an access gateway during UE registration.

FIG. 7 depicts one embodiment of a method 700 for relocating an access gateway during UE registration, according to embodiments of the disclosure. In various embodiments, the method 700 is performed by a TNGF, such as the TNGF 125, TNGF 127, TNGF-1 211, and/or network equipment apparatus 600. In some embodiments, the method 700 is performed by a processor, such as a microcontroller, a microprocessor, a CPU, a GPU, an auxiliary processing unit, a FPGA, or the like.

The method 700 begins and initiates 705 registration of a remote unit with a mobile communication network. The method 700 includes receiving 710 a relocation command from an AMF in the mobile communication network while the registration is ongoing. Here, the relocation command contains an address of a first TNGF in the mobile communication network and a first security key.

The method 700 includes determining 715 whether connectivity with the first TNGF is supported. If connectivity with the first TNGF is supported, then the method 700 includes sending 720 a first request to the first TNGF, the first request containing a remote unit identity and an AMF identity. However, if connectivity with the first TNGF is not supported, then the method 700 includes sending 725 a relocation reject message to the AMF. The method 700 ends.

Figure 8:
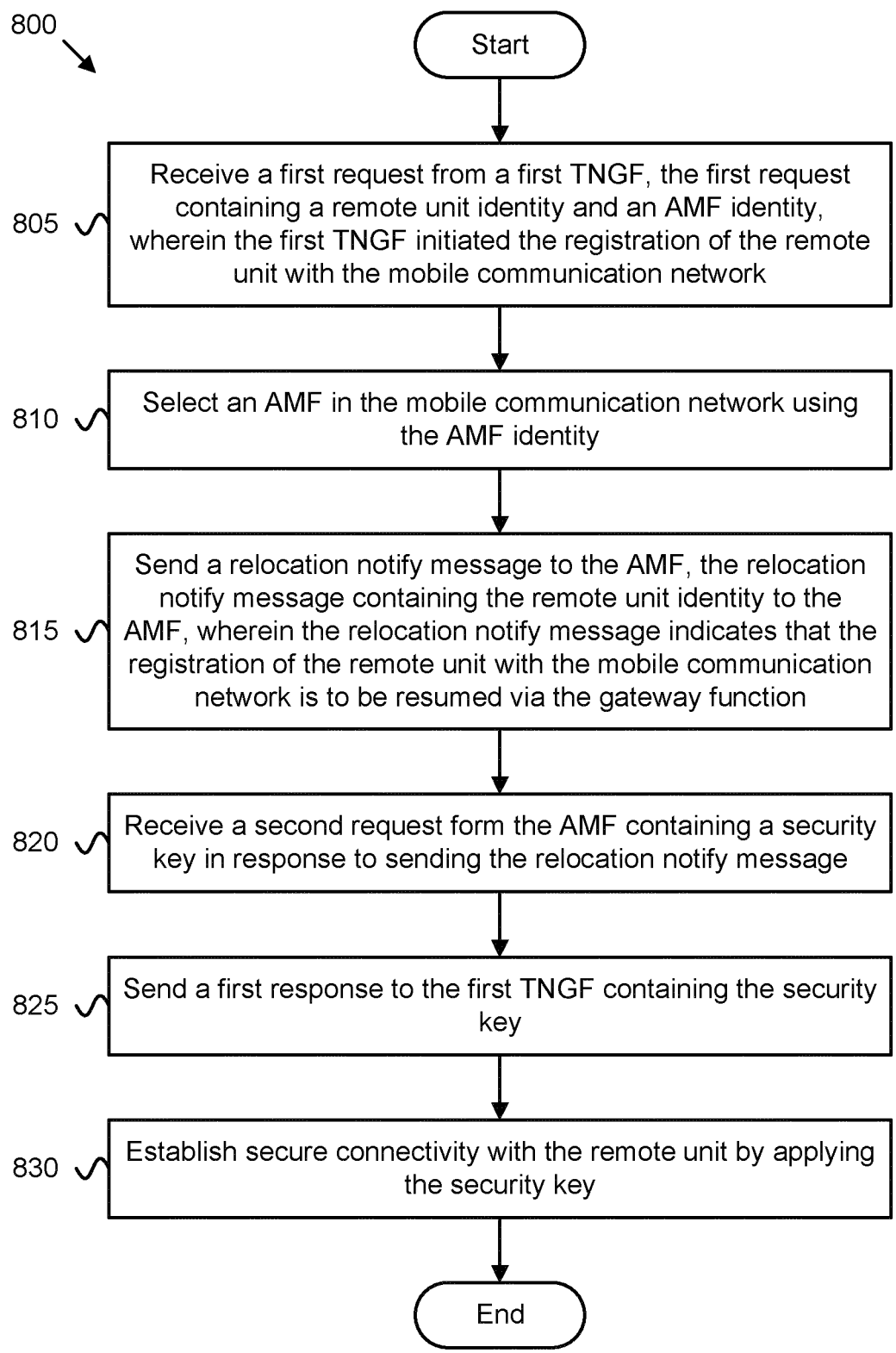
FIG. 8 is a flow chart diagram illustrating one embodiment of a second method for relocating an access gateway during UE registration.

FIG. 8 depicts one embodiment of a method 800 for relocating an access gateway during UE registration, according to embodiments of the disclosure. In various embodiments, the method 800 is performed by a TNGF, such as the TNGF 125, TNGF 127, TNGF-2 213, and/or network equipment apparatus 600. In some embodiments, the method 800 is performed by a processor, such as a microcontroller, a microprocessor, a CPU, a GPU, an auxiliary processing unit, a FPGA, or the like.

The method 800 begins and receives 805 a first request from a first TNGF, the first request containing a remote unit identity and an AMF identity. Here, the first TNGF initiated registration of the remote unit with a mobile communication network. The method 800 includes selecting 810 an AMF in the mobile communication network using the AMF identity.

The method 800 includes sending 815 a relocation notify message to the AMF, the relocation notify message containing the remote unit identity. Here, the relocation notify message indicates that the registration of the remote unit with the mobile communication network is to be resumed via the sending TNGF. The method 800 includes receiving 820 a second request from the AMF containing a security key (i.e., TNGF key) in response to sending the relocation notify message.

The method 800 includes sending 825 a first response to the first TNGF. The method 800 includes establishing 830 secure connectivity (e.g., IPsec SA) with the remote unit by applying the security key. The method 800 ends.

Figure 9:
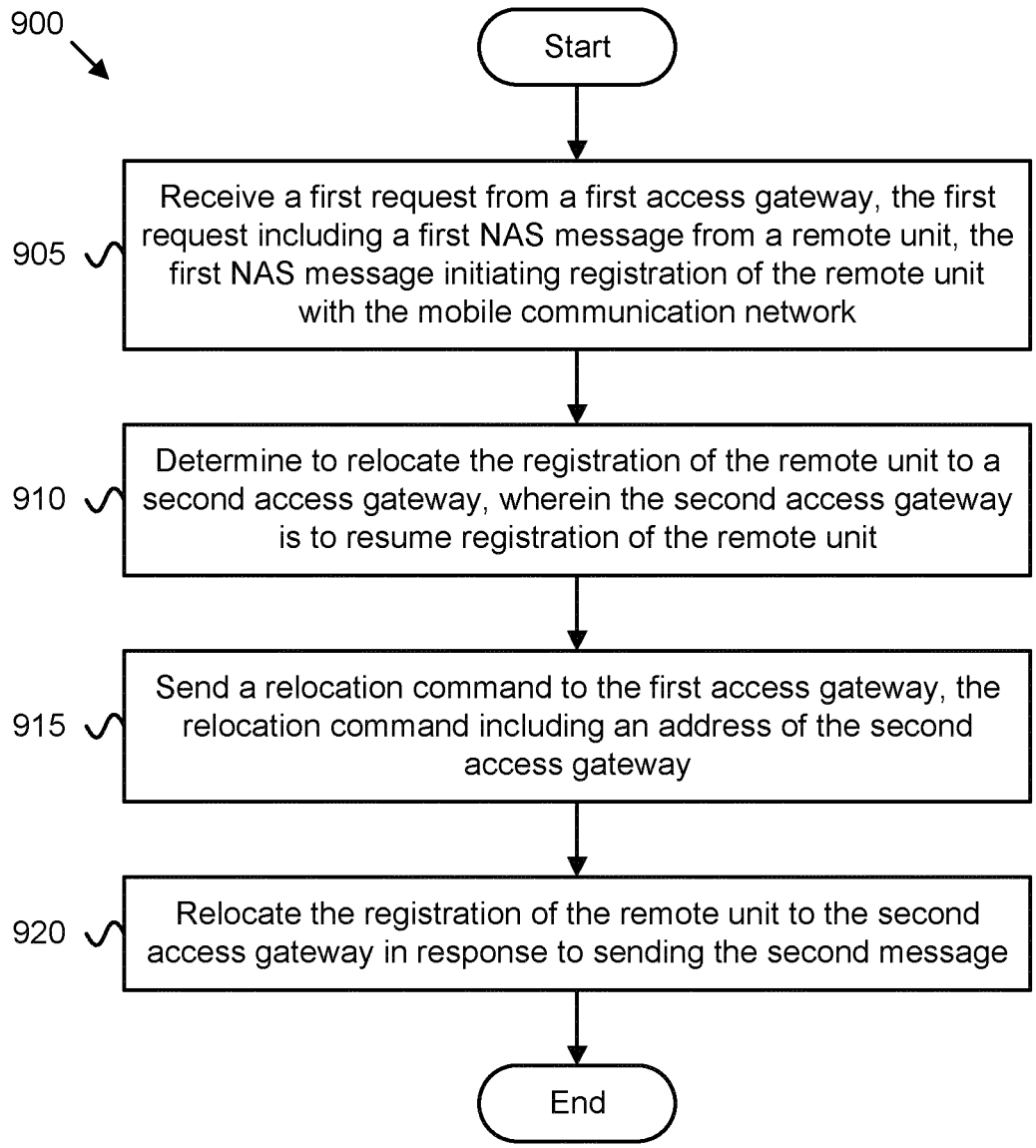
FIG. 9 is a flow chart diagram illustrating one embodiment of a third method for relocating an access gateway during UE registration.

FIG. 9 depicts one embodiment of a method 900 for relocating an access gateway during UE registration, according to embodiments of the disclosure. In various embodiments, the method 900 is performed by an AMF, such as the AMF 143, the AMF 215, and/or the network equipment apparatus 600. In some embodiments, the method 900 is performed by a processor, such as a microcontroller, a microprocessor, a CPU, a GPU, an auxiliary processing unit, a FPGA, or the like.

The method 900 begins and receives 905 a first request from a first access gateway, the first request including a first NAS message (i.e., Registration Request) from a remote unit, the first NAS message initiating registration of the remote unit with a mobile communication network via the first access gateway. The method 900 includes determining 910 to relocate the registration of the remote unit to a second access gateway. Here, the second access gateway is to resume registration of the remote unit.

The method 900 includes sending 915 a relocation command to the first access gateway, the relocation command including an address of the second access gateway. The method 900 includes relocating 920 the registration of the remote unit to the second access gateway in response to sending the relocation command. The method 900 ends.

Figure 10:
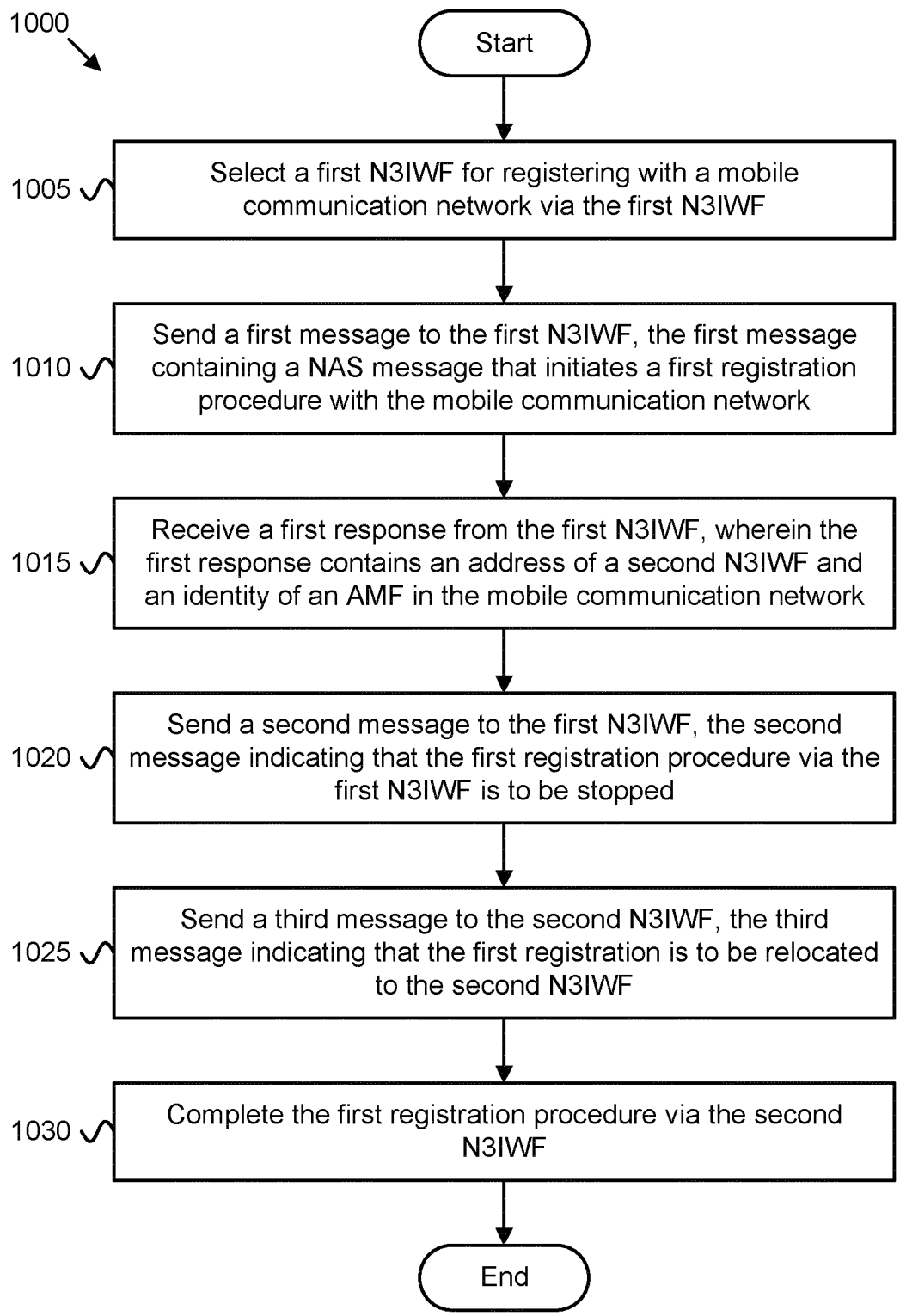
FIG. 10 is a flow chart diagram illustrating one embodiment of a fourth method for relocating an access gateway during UE registration.

FIG. 10 depicts one embodiment of a method 1000 for relocating an access gateway during UE registration, according to embodiments of the disclosure. In various embodiments, the method 1000 is performed by a UE, such as the remote unit 105, the UE 205, and/or the user equipment apparatus 500, described above. In some embodiments, the method 1000 is performed by a processor, such as a microcontroller, a microprocessor, a CPU, a GPU, an auxiliary processing unit, a FPGA, or the like.

The method 1000 begins and selects 1005 a first N3IWF for registering with a mobile communication network via the first N3IWF. The method 1000 includes sending 1010 a first message to the first N3IWF, the first message containing a NAS message that initiates a first registration procedure with the mobile communication network.

The method 1000 includes receiving 1015 a first response from the first N3IWF. Here, the first response contains an address of a second N3IWF and an identity of an AMF in the mobile communication network. The method 1000 includes sending 1020 a second message to the first N3IWF, the second message indicating that the first registration procedure via the first N3IWF is to be stopped.

The method 1000 includes sending 1025 a third message to the second N3IWF and completing the first registration procedure via the second N3IWF. Here, the third message indicates that the first registration is to be relocated to the second N3IWF. The method 1000 ends.

Disclosed herein is a first apparatus for relocating an access gateway during UE registration, according to embodiments of the disclosure. The first apparatus may be implemented by a TNGF, such as the TNGF 125, TNGF 127, TNGF-1 211, and/or network equipment apparatus 600. The first apparatus includes an interface that communicates with a remote unit via a non-3GPP access network and communicates with a plurality of network functions in a mobile communication network (including an AMF and a first TNGF). The first apparatus includes a processor that initiates registration of the remote unit with the mobile communication network and receives a relocation command from an AMF while the registration is ongoing. Here, the relocation command contains an address of a first TNGF and a first security key.

The processor determines whether connectivity with the first TNGF is supported. If connectivity with the first TNGF is supported, then the processor sends a first request to the first TNGF, the first request containing a remote unit identity and an AMF identity. However, if connectivity with the first TNGF is not supported, then the processor sends a relocation reject message to the AMF.

In some embodiments, the processor initiates registration of the remote unit with the mobile communication network by sending an Extensible Authentication Protocol 5G ("EAP-5G") packet to the remote unit containing a Start indication. In such embodiments, the processor further relays at least one NAS message between the remote unit and the AMF. In some embodiments, the processor forwards the address of the first TNGF to the remote unit prior to sending the first request to the first TNGF or sending the relocation reject message to the AMF.

In some embodiments, the relocation command includes a SMC Request, wherein the processor forwards the SMC Request and the address of the first TNGF to the remote unit prior to sending the first request to the first TNGF or sending the relocation reject message to the AMF, and wherein the processor receives a message from the remote unit in response to forwarding the SMC Request, the message from the remote unit containing a SMC Response.

In certain embodiments, the first request includes the SMC Response, wherein the processor receives a first response from the first TNGF, wherein the processor generates a second security key using the first security key and forwards the second security key to an access point serving the remote unit in the non-3GPP access network. In other embodiments, the relocation reject message includes an SMC Response. In various embodiments, the SMC Request is a SECURITY MODE COMMAND message and the SMC Response is a SECURITY MODE COMPLETE message.

In some embodiments, the relocation command containing the address of the first TNGF indicates that the first TNGF is selected to resume the registration of the remote unit with the mobile communication network. In certain embodiments, the first TNGF is selected to resume the registration of the remote unit with the mobile communication network, in response to determining at the AMF that the apparatus does not support an allowed set of network slices (e.g., Allowed NSSAI) for the remote unit, wherein the first TNGF supports the allowed set of network slices (Allowed NSSAI).

In some embodiments, the relocation command contains the AMF identity. In one embodiment, the AMF identity is a GUAMI. In another embodiment, the AMF identity is an IP address of the AMF. Note that if the AMF identity in the first request is a GUAMI (not an IP address), then the GUAMI must be provided by the AMF.

Disclosed herein is a first method for relocating an access gateway during UE registration, according to embodiments of the disclosure. The first method may be performed by a TNGF, such as the TNGF 125, TNGF 127, TNGF-1 211, and/or network equipment apparatus 600. The first method includes initiating registration of a remote unit with a mobile communication network and receiving a relocation command from an AMF in the mobile communication network while the registration is ongoing. Here, the relocation command contains an address of a first TNGF in the mobile communication network and a first security key.

The first method includes determining whether connectivity with the first TNGF is supported. If connectivity with the first TNGF is supported, then the first method includes sending a first request to the first TNGF, the first request containing a remote unit identity and an AMF identity. However, if connectivity with the first TNGF is not supported, then the first method includes sending a relocation reject message to the AMF.

In some embodiments, initiating registration of the remote unit with the mobile communication network includes sending an Extensible Authentication Protocol 5G ("EAP-5G") packet to the remote unit containing a Start indication. In such embodiments, the first method further includes relaying at least one NAS message between the remote unit and the AMF. In some embodiments, the first method includes forwarding the address of the first TNGF to the remote unit prior to sending the first request to the first TNGF or sending the relocation reject message to the AMF.

In some embodiments, the relocation command includes a SMC Request. In such embodiments, the first method includes forwarding the SMC Request and the address of the first TNGF to the remote unit prior to sending the first request to the first TNGF or sending the relocation reject message to the AMF, and receiving a message from the remote unit in response to forwarding the SMC Request, the message from the remote unit containing a SMC Response.

In certain embodiments, the first request includes the SMC Response. In such embodiments, the first method includes receiving a first response from the first TNGF, generating a second security key using the first security key and forwarding the second security key to an access point serving the remote unit in the non-3GPP access network. In other embodiments, the relocation reject message includes an SMC Response. In various embodiments, the SMC Request is a SECURITY MODE COMMAND message and the SMC Response is a SECURITY MODE COMPLETE message.

In some embodiments, the relocation command containing the address of the first TNGF indicates that the first TNGF is selected to resume the registration of the remote unit with the mobile communication network. In certain embodiments, the first TNGF is selected to resume the registration of the remote unit with the mobile communication network, in response to determining at the AMF that the apparatus does not support an allowed set of network slices (e.g., Allowed NSSAI) for the remote unit, wherein the first TNGF supports the allowed set of network slices (Allowed NSSAI).

In some embodiments, the relocation command contains the AMF identity. In one embodiment, the AMF identity is a GUAMI. In another embodiment, the AMF identity is an IP address of the AMF. Note that if the AMF identity in the first request is a GUAMI (not an IP address), then the GUAMI must be provided by the AMF.

Disclosed herein is a second apparatus for relocating an access gateway during UE registration, according to embodiments of the disclosure. The second apparatus may be implemented by a TNGF, such as the TNGF 125, TNGF 127, TNGF-2 213, and/or network equipment apparatus 600. The second apparatus includes an interface that communicates with a plurality of network functions in a mobile communication network (including AMF and first TNGF). The second apparatus includes a processor that receives a first request from a first TNGF, the first request containing a remote unit identity and an AMF identity. Here, the first TNGF initiated registration of the remote unit with the mobile communication network.

The processor selects an AMF in the mobile communication network using the AMF identity and sends a relocation notify message to the AMF, the relocation notify message containing the remote unit identity. Here, the relocation notify message indicates that the registration of the remote unit with the mobile communication network is to be resumed via the apparatus. The processor receives a second request from the AMF containing a security key in response to sending the relocation notify message, sends a first response to the first TNGF, and establishes secure connectivity (e.g., IPsec SA) with the remote unit by applying the security key.

In some embodiments, the first request contains a SMC Request message, wherein the relocation notify message sent to the AMF contains the SMC Request message. In various embodiments, the SMC Request is a SECURITY MODE COMMAND message. In some embodiments, the processor sends a second response to the AMF in response to establishing secure connectivity with the remote unit.

In some embodiments, the processor further completes the registration of the remote unit with the mobile communication network in response to establishing the secure connectivity with the remote unit. In some embodiments, the first TNGF does not support an allowed set of network slices (e.g., Allowed NSSAI) for the remote unit, wherein the apparatus supports the allowed set of network slices (Allowed NSSAI).

Disclosed herein is a second method for relocating an access gateway during UE registration, according to embodiments of the disclosure. The second method may be performed by a TNGF, such as the TNGF 125, TNGF 127, TNGF-2 213, and/or network equipment apparatus 600. The second method includes receiving a first request from a first TNGF, the first request containing a remote unit identity and an AMF identity. Here, the first TNGF initiated registration of the remote unit with a mobile communication network. The second method includes selecting an AMF in the mobile communication network using the AMF identity and sending a relocation notify message to the AMF, the relocation notify message containing the remote unit identity. Here, the relocation notify message indicates that the registration of the remote unit with the mobile communication network is to be resumed via the sending TNGF. The second method includes receiving a second request from the AMF containing a security key in response to sending the relocation notify message, sending a first response to the first TNGF, and establishing secure connectivity (e.g., IPsec SA) with the remote unit by applying the security key.

In some embodiments, the first request contains a SMC Request message, wherein the relocation notify message sent to the AMF contains the SMC Request message. In various embodiments, the SMC Request is a SECURITY MODE COMMAND message. In some embodiments, the second method further includes sending a second response to the AMF in response to establishing secure connectivity with the remote unit.

In some embodiments, the second method further includes completing the registration of the remote unit with the mobile communication network in response to establishing the secure connectivity with the remote unit. In some embodiments, the first TNGF does not support an allowed set of network slices (e.g., Allowed NSSAI) for the remote unit, wherein the apparatus supports the allowed set of network slices (Allowed NSSAI).

Disclosed herein is a third apparatus for relocating an access gateway during UE registration, according to embodiments of the disclosure. The third apparatus may be implemented by an AMF, such as the AMF 143, the AMF 215, and/or the network equipment apparatus 600. The third apparatus includes an interface that communicates with a plurality of access gateways supporting connectivity to the mobile communication network via a non-3GPP access network. The third apparatus includes a processor that receives a first request from a first access gateway, the first request including a first NAS message from a remote unit, the first NAS message initiating registration of the remote unit with the mobile communication network via the first access gateway. The processor determines to relocate the registration of the remote unit to a second access gateway. Here, the second access gateway is to resume registration of the remote unit. The processor sends a relocation command to the first access gateway, the relocation command including an address of the second access gateway and relocates the registration of the remote unit to the second access gateway in response to sending the relocation command.

In some embodiments, the relocation command includes a SMC Request message for the remote unit, wherein the processor receives a relocation notify message from the second access gateway, the relocation notify message containing a SMC Response message from the remote unit. In various embodiments, the SMC Request is a SECURITY MODE COMMAND message and the SMC Response is a SECURITY MODE COMPLETE message.

In some embodiments, the first access gateway is a first TNGF in the non-3GPP access network, wherein the second access gateway is a second TNGF in the non-3GPP access network, and wherein relocating the registration of the remote unit uses a procedure selected based on whether connectivity between the first TNGF and the second TNGF is supported. In such embodiments, the processor relocates the registration of the remote unit to the second TNGF by determining that connectivity between the first TNGF and the second TNGF is not supported, wherein the processor determines that connectivity between the first TNGF and the second TNGF is not supported in response to receiving a relocation reject message from the first TNGF in response to sending the relocation command message.

In some embodiments, the relocating the registration of the remote unit to the second TNGF includes sending an Initial Context Setup Request message to the second TNGF containing a remote unit identity and a security key, in response to determining that connectivity between the first TNGF and the second TNGF is not supported. In certain embodiments, the processor releases connectivity with the first TNGF after sending the Initial Context Setup Request message to the second TNGF.

In some embodiments, the relocating the registration of the remote unit to the second TNGF further comprises: receiving a notification message from the second TNGF, wherein the notification message indicates that connectivity between the first TNGF and the second TNGF is supported; and sending an Initial Context Setup Request to the second TNGF containing a security key in response to receiving the notification message. In certain embodiments, the processor releases connectivity with the first TNGF after receiving the notification message from the second TNGF.

In some embodiments, the first access gateway is a first N3IWF in the non-3GPP access network, wherein the second access gateway is a second N3IWF in the non-3GPP access network, and wherein the relocation command includes an AMF identity of the apparatus. In certain embodiments, the identity of the AMF is used by the second N3IWF to select the same AMF selected by the first N3IWF.

In some embodiments, the processor relocates the registration of the remote unit to the second N3IWF by: receiving a notification message from the second N3IWF, wherein the notification message indicates that the remote unit resumes registration via the second N3IWF, sending an Initial Context Setup Request to the second N3IWF containing a security key to be used for establishing a secure connection with the remote unit in response to receiving the notification message, and receiving a response from the second N3IWF confirming that the secure connection with the remote unit is established.

Disclosed herein is a third method for relocating an access gateway during UE registration, according to embodiments of the disclosure. The third method may be implemented by an AMF, such as the AMF 143, the AMF 215, and/or the network equipment apparatus 600. The third method includes receiving a first request from a first access gateway, the first request including a first NAS message from a remote unit, the first NAS message initiating registration of the remote unit with a mobile communication network via the first access gateway. The third method includes determining to relocate the registration of the remote unit to a second access gateway. Here, the second access gateway is to resume registration of the remote unit. The third method includes sending a relocation command to the first access gateway and relocating the registration of the remote unit to the second access gateway in response to sending the relocation command, where the relocation command includes an address of the second access gateway.

In some embodiments, the relocation command includes a SMC Request message for the remote unit, wherein third method includes receiving a relocation notify message from the second access gateway, the relocation notify message containing a SMC Response message from the remote unit. In various embodiments, the SMC Request is a SECURITY MODE COMMAND message and the SMC Response is a SECURITY MODE COMPLETE message.

In some embodiments, the first access gateway is a first TNGF in the non-3GPP access network, wherein the second access gateway is a second TNGF in the non-3GPP access network, and wherein relocating the registration of the remote unit uses a procedure selected based on whether connectivity between the first TNGF and the second TNGF is supported. In such embodiments, third method includes relocating the registration of the remote unit to the second TNGF by determining that connectivity between the first TNGF and the second TNGF is not supported, wherein third method includes determining that connectivity between the first TNGF and the second TNGF is not supported in response to receiving a relocation reject message from the first TNGF in response to sending the relocation command message.

In some embodiments, the relocating the registration of the remote unit to the second TNGF includes sending an Initial Context Setup Request message to the second TNGF containing a remote unit identity and a security key, in response to determining that connectivity between the first TNGF and the second TNGF is not supported. In certain embodiments, third method includes releasing connectivity with the first TNGF after sending the Initial Context Setup Request message to the second TNGF.

In some embodiments, the relocating the registration of the remote unit to the second TNGF further comprises: receiving a notification message from the second TNGF, wherein the notification message indicates that connectivity between the first TNGF and the second TNGF is supported; and sending an Initial Context Setup Request to the second TNGF containing a security key in response to receiving the notification message. In certain embodiments, third method includes releasing connectivity with the first TNGF after receiving the notification message from the second TNGF.

In some embodiments, the first access gateway is a first N3IWF in the non-3GPP access network, wherein the second access gateway is a second N3IWF in the non-3GPP access network, and wherein the relocation command includes an AMF identity of the apparatus. In certain embodiments, the identity of the AMF is used by the second N3IWF to select the same AMF selected by the first N3IWF.

In some embodiments, third method includes relocating the registration of the remote unit to the second N3IWF by: receiving a notification message from the second N3IWF, wherein the notification message indicates that the remote unit resumes registration via the second N3IWF, sending an Initial Context Setup Request to the second N3IWF containing a security key to be used for establishing a secure connection with the remote unit in response to receiving the notification message and receiving a response from the second N3IWF confirming that the secure connection with the remote unit is established.

Disclosed herein is a fourth apparatus for relocating an access gateway during UE registration, according to embodiments of the disclosure. The fourth apparatus may be implemented by a UE, such as the remote unit 105, the UE 205, and/or the user equipment apparatus 500. The fourth apparatus includes a transceiver that communicates with a non-3GPP access network; and a processor that selects a first N3IWF for registering with a mobile communication network via the first N3IWF. The processor sends a first message to the first N3IWF, the first message containing a NAS message that initiates a first registration procedure with the mobile communication network and receives a first response from the first N3IWF. Here, the first response contains an address of a second N3IWF and an identity of an AMF in the mobile communication network. The processor sends a second message to the first N3IWF, the second message indicating that the first registration procedure via the first N3IWF is to be stopped and sends a third message to the second N3IWF, the third message indicting that the first registration is to be relocated to the second N3IWF. The processor completes the first registration procedure via the second N3IWF.

In some embodiments, the first message comprises an identity of the mobile communication network and an establishment cause. In certain embodiments, the establishment cause indicates that the first registration is to be relocated to the second N3IWF. In some embodiments, the first response is received after mutual authentication and key agreement. In some embodiments, the third message comprises a second NAS message that resumes the first registration procedure via the second N3IWF. In various embodiments, the first NAS message comprises a Registration Request, wherein the second NAS message comprises a SMC Complete message.

In some embodiments, the third message contains the identity of the AMF, wherein the identity of the AMF indicates that the first registration is to be relocated to the second N3IWF, and wherein the identity of the AMF is used by the second N3IWF to select the same AMF selected by the first N3IWF. In some embodiments, completing the registration with the mobile communication network via the second N3IWF includes establishing an NWu connection with the second N3IWF and receiving a Registration Accept via the established NWu connection.

Disclosed herein is a fourth method for relocating an access gateway during UE registration, according to embodiments of the disclosure. The fourth method may be implemented by a UE, such as the remote unit 105, the UE 205, and/or the user equipment apparatus 500. The fourth method includes selecting a first N3IWF for registering with a mobile communication network via the first N3IWF and sending a first message to the first N3IWF, the first message containing a NAS message that initiates a first registration procedure with the mobile communication network. The fourth method includes receiving a first response from the first N3IWF and sending a second message to the first N3IWF. Here, the first response contains an address of a second N3IWF and an identity of an AMF in the mobile communication network and the second message indicating that the first registration procedure via the first N3IWF is to be stopped. The fourth method includes sending a third message to the second N3IWF and completing the first registration procedure via the second N3IWF. Here, the third message indicates that the first registration is to be relocated to the second N3IWF.

In some embodiments, the first message comprises an identity of the mobile communication network and an establishment cause. In certain embodiments, the establishment cause indicates that the first registration is to be relocated to the second N3IWF. In some embodiments, the first response is received after mutual authentication and key agreement. In some embodiments, the third message comprises a second NAS message that resumes the first registration procedure via the second N3IWF. In various embodiments, the first NAS message comprises a Registration Request, wherein the second NAS message comprises a SMC Complete message.

In some embodiments, the third message contains the identity of the AMF, wherein the identity of the AMF indicates that the first registration is to be relocated to the second N3IWF, and wherein the identity of the AMF is used by the second N3IWF to select the same AMF selected by the first N3IWF. In some embodiments, completing the registration with the mobile communication network via the second N3IWF includes establishing an NWu connection with the second N3IWF and receiving a Registration Accept via the established NWu connection.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus in a mobile communication network comprising:
  at least one memory; and
  at least one processor coupled with the at least one memory and configured to cause an access and mobility management function ("AMF") to:
  receive a first request from a first access gateway, the first request including a first non-access stratus ("NAS") message from a user equipment ("UE"), the first NAS message initiating registration of the UE with the mobile communication network via the first access gateway;
  determine whether the first access gateway provides services for the UE;
  determine to relocate the registration of the UE to a second access gateway in response to determining that the first access gateway does not provide the services for the UE, wherein the second access gateway is to resume registration of the UE;
  transmit a relocation command to the first access gateway, the relocation command including an address of the second access gateway and a security mode control ("SMC") request message for establishing a security context for the UE; and
  relocate the registration of the UE to the second access gateway in response to transmitting the relocation command.

2. The apparatus of claim 1, wherein the at least one processor is configured to cause the apparatus to receive a relocation notify message from the second access gateway, the relocation notify message containing a SMC Response message from the UE.

3. The apparatus of claim 1, wherein the first access gateway is a first Non-3GPP Interworking Function ("N3IWF") in a non-3GPP access network, wherein the second access gateway is a second N3IWF in the non-3GPP access network, and wherein the relocation command includes an AMF identity of the apparatus.

4. The apparatus of claim 3, wherein the identity of the AMF is used by the second N3IWF to select the same AMF selected by the first N3IWF.

5. The apparatus of claim 3, wherein, to relocate the registration of the UE, the at least one processor is configured to cause the apparatus to:
  receive a notification message from the second N3IWF, wherein the notification message indicates that the UE resumes registration via the second N3IWF;
  transmit an Initial Context Setup Request to the second N3IWF containing a security key to be used for establishing a secure connection with the UE in response to receiving the notification message; and
  receive a response from the second N3IWF confirming that the secure connection with the UE is established.

6. A user equipment ("UE") comprising:
  at least one memory; and
  at least one processor coupled with at least one memory and configured to cause the UE to:
  select a first non-3GPP interworking function ("N3IWF") for registering with a mobile communication network via the first N3IWF;
  transmit a first message to the first N3IWF, the first message containing a first non-access stratum ("NAS") message that initiates a first registration procedure with the mobile communication network;
  receive a first response from the first N3IWF, wherein the first response comprises an address of a second N3IWF, an indication that the first N3IWF does not provide service for the UE, a security mode control ("SMC") request message for establishing a security context, and an identity of an access and mobility management function ("AMF") in the mobile communication network;
  transmit a second message to the first N3IWF in response to the indication that the first N3IWF does not provide services for the UE, the second message indicating that the first registration procedure via the first N3IWF is to be stopped;
  transmit a third message to the second N3IWF, the third message indicating that the first registration is to be relocated to the second N3IWF; and
  complete the first registration procedure via the second N3IWF.

7. The UE of claim 6, wherein the first message contains an identity of the mobile communication network and an establishment cause.

8. The UE of claim 7, wherein the establishment cause indicates that the first registration is to be relocated to the second N3IWF.

9. The UE of claim 6, wherein the first response is received after mutual authentication and key agreement.

10. The UE of claim 6, wherein the third message comprises a second NAS message that resumes the first registration procedure via the second N3IWF.

11. The UE of claim 10, wherein the first NAS message is a Registration Request message and the second NAS message is a SMC Complete message.

12. The UE of claim 6, wherein the third message contains the identity of the AMF, wherein the identity of the AMF indicates that the first registration is to be relocated to the second N3IWF, and wherein the identity of the AMF is used by the second N3IWF to select the same AMF selected by the first N3IWF.

13. The UE of claim 6, wherein, to complete the registration with the mobile communication network via the second N3IWF, the at least one processor is configured to cause the UE to:
  establish a non-3GPP wireless user plane ("NWu") connection with the second N3IWF, and
  receive a Registration Accept via the established NWu connection.

14. A method performed by a user equipment ("UE"), the method comprising:
  selecting a first non-3GPP interworking function ("N3IWF") for registering with a mobile communication network via the first N3IWF;
  transmitting a first message to the first N3IWF, the first message containing a first non-access stratum ("NAS") message that initiates a first registration procedure with the mobile communication network;
  receiving a first response from the first N3IWF, wherein the first response contains comprises an address of a second N3IWF, an indication that the first N3IWF does not provide service for the UE, a security mode control ("SMC") request message for establishing a security context, and an identity of an access and mobility management function ("AMF") in the mobile communication network;
  transmitting a second message to the first N3IWF in response to the indication that the first N3IWF does not provide services for the UE, the second message indicating that the first registration procedure via the first N3IWF is to be stopped;

transmitting a third message to the second N3IWF, the third message indicating that the first registration is to be relocated to the second N3IWF; and completing the first registration procedure via the second N3IWF.

15. The method of claim 14, wherein the first message contains an identity of the mobile communication network and an establishment cause.

16. The method of claim 15, wherein the establishment cause indicates that the first registration is to be relocated to the second N3IWF.

17. The method of claim 14, wherein the first response is received after mutual authentication and key agreement.

18. The method of claim 14, wherein the third message comprises a second NAS message that resumes the first registration procedure via the second N3IWF.

19. The method of claim 18, wherein the first NAS message is a Registration Request message and the second NAS message is a SMC Complete message.

20. The method of claim 14, wherein the third message contains the identity of the AMF, wherein the identity of the AMF indicates that the first registration is to be relocated to the second N3IWF, and wherein the identity of the AMF is used by the second N3IWF to select the same AMF selected by the first N3IWF.

* * * * *